United States Patent [19]
Takahashi et al.

[11] Patent Number: 5,706,497
[45] Date of Patent: Jan. 6, 1998

[54] DOCUMENT RETRIEVAL USING FUZZY-LOGIC INFERENCE

[75] Inventors: Kousuke Takahashi, Yokohama, Japan; Karvel K. Thornber, Berekley Heights, N.J.

[73] Assignees: NEC Research Institute, Inc., Princeton, N.J.; NEC Corp., Tokyo, Japan

[21] Appl. No.: 290,332

[22] Filed: Aug. 15, 1994

[51] Int. Cl.⁶ .................................................. G06F 17/30
[52] U.S. Cl. .................................... 395/605; 395/606
[58] Field of Search ........................... 364/728, 900, 364/807; 395/600, 51, 61, 606, 605; 348/419

[56] References Cited

U.S. PATENT DOCUMENTS

| | | | |
|---|---|---|---|
| 4,270,182 | 5/1981 | Asija | 364/900 |
| 4,531,201 | 7/1985 | Skinner, Jr. | 364/900 |
| 4,839,853 | 6/1989 | Deerwester et al. | 364/900 |
| 4,875,184 | 10/1989 | Yamakawa | 364/807 |
| 4,958,377 | 9/1990 | Takahashi | 382/34 |
| 4,979,101 | 12/1990 | Takahashi | 364/200 |
| 5,020,019 | 5/1991 | Ogawa | 364/900 |
| 5,175,795 | 12/1992 | Tsuda et al. | 395/3 |
| 5,191,638 | 3/1993 | Nakami et al. | 395/51 |
| 5,263,125 | 11/1993 | Viot et al. | 395/51 |
| 5,272,657 | 12/1993 | Basehore et al. | 364/728 |
| 5,321,833 | 6/1994 | Chang et al. | 395/606 |
| 5,384,894 | 1/1995 | Vassiliadis et al. | 395/605 |
| 5,388,259 | 2/1995 | Fleischman et al. | 395/605 |
| 5,414,797 | 5/1995 | Vassiliadis et al. | 395/51 |
| 5,471,677 | 11/1995 | Imanaka | 395/606 |
| 5,475,433 | 12/1995 | Jeong | 348/419 |
| 5,524,179 | 6/1996 | Kanda | 395/51 |
| 5,579,471 | 11/1996 | Barber et al. | 395/326 |
| 5,600,835 | 2/1997 | Garland et al. | 395/605 |
| 5,606,690 | 2/1997 | Hunter et al. | 395/605 |

OTHER PUBLICATIONS

Du et al. An Efficient File Structure for Document Retrieval in the Automated Office Environment, IEEE, pp. 258–273, Jun. 1989.

The Fidelity of Fuzzy–Logic Inference Nov. 1993 by by K. K. Thornber pp. 288–297 (IEEE).

A New Look at Fuzzy–Logic Inference by K.K. Thornber (IEEE) pp. 271–278.

The Role of Fidelity in Fuzzy–Logic Inference by K.K.Thornber pp. 938–943 (IEEE).

L. A. Zadeh, "Fuzzy Sets", Information and Control 8, pp. 338–353 (1965).

Ebrahim H. Mamdani, "Application of Fuzzy Logic to Approximate Reasoning Using Linguistic Synthesis", IEEE Transactions on Computers, vol. C–26 No. 12, Dec. 1977, pp. 1182–1191.

Lee A. Hollaar, "Text Retrieval Computers", IEEE Computer 12 (3) pp. 40–50, Mar. 1979.

Gerard Salton, "Automatic Information Retrieval", IEEE Computer, Sep. 1980 pp. 41–56.

Abraham Kandel, "Fuzzy Techniques in Pattern Recognition", J. Wiley & Sons, Inc. 1982, pp. 8–21 and 130–139.

K. Takahashi, et al, "A New String Search Hardware Architecture for VLSI", Proc. of 13th Anniv. Int'l. Symp. of Comp. Arch, pp. 20–27, Jun. 1986.

Kousuke Takahashi et al, "A String Search Processor LSI", Journal of Information Processing, vol. 13(2), 1990, pp. 183–189.

Gerard Salton et al, "Introduction to Modern Information Retrieval", McGraw Hill, 420–427, 1983.

*Primary Examiner*—Thomas G. Black
*Assistant Examiner*—Frantz Coby
*Attorney, Agent, or Firm*—Philip J. Feig

[57] ABSTRACT

The results of a full-text, document search by a character string search processor are treated as vector patterns whose elements become a term match grade by use of a membership function of the term match frequency. The closest pattern to the query pattern is found by the similarity between the query pattern and each of the filed sample patterns. The similarity is calculated by use of fuzzy-logic. The similarity is ranked in order of similarity magnitude, thereby reducing the search time. The search time can be shortened by categorizing the filed patterns by term set and similarity to a cluster center pattern. If the cluster center patterns are stored, the closest cluster address can be inferred by fuzzy logic inference from the match between the query document and the term set or the similarity of the query to the cluster center.

20 Claims, 13 Drawing Sheets

DOCUMENT RETRIEVAL USING FUZZY-LOGIC INFERENCE

FIELD OF THE INVENTION

The present invention relates to document retrieval and specifically to the use of fuzzy-logic inference in pattern matching for such document retrieval.

BACKGROUND OF THE INVENTION

A document retrieval system must quickly find those documents from filed documents such as patents, scientific papers or investigative reports which are very close in nature to the document being sought. The conventional document database systems or information retrieval systems currently in use exhibit problems in terms of accuracy of similarities between the query and matched documents and in database construction time. These problems are not yet solved because of the cost of placing the massive text documents into a structured database index file.

Full-text search systems are expected to allow closest document retrieval without using a structured database index file. Thus, an approximate character-string-search processor SSP has been developed as an integrated circuit chip for accelerating the full text search of the documents. Currently, these chips are used to search the memory contents of a disk or semiconductor file memory. The text search results, such as number matches, can be temporarily stored in the same file memory. When the full text search of each document is completed, the text search results are transferred to the host computer. However, from the point of view of finding the closest document, even if the search speed is high, the total performance has not been sufficient, because the search results are processed by software to find the ranked closest documents.

If the search results are considered as patterns, the closest patterns can be found by pattern-matching technique. Further, the patterns can be categorized hierarchically and then by using pattern-classification techniques it is possible to quickly find the cluster which contains the closest pattern.

Fuzzy-logic theory in general has been shown to be a useful approach for solving ambiguous pattern classification problems. However, there are only a few application systems for document retrieval. Prior information retrieval systems have used fuzzy logic for improving the query expression and the thesaurus expression for retrieval.

In practice, the query expression and thesaurus expression are vague. The preparation of a useful thesaurus term dictionary is needed for practical use. However, there are no good thesauri for Japanese terms. Thus, even if the thesaurus expression is improved by the use of fuzzy logic theory, this approach will take a long time. As a result, database construction time is not reduced as a result of the need for preparing a fuzzy logic thesaurus.

In accordance with the teachings of the present invention, a closest document retrieval system expression improvement is not achieved because the semantic relationship between terms is not easily structured, even with the use of fuzzy-logic set theory. Instead, several terms are extracted manually from each of the filed documents shown on the display screen. These terms are then used to build the term set which includes several thousand terms.

The full text search system provides a function for locating filed documents which include the query terms. The full text search result, by means of a set of query terms, is used to remind a searcher of related terms from the matched documents. Since the related terms can be added to the original set of query terms, the set of terms grows larger while the full text search operation is repeated using the related terms. The term set is used to express the similarity between documents. Further, fuzzy logic is used to handle the ambiguity in document to document similarity.

In order to better understand the invention, some basic concepts of fuzzy logic and fuzzy-logic inference will now be described.

A first feature of fuzzy logic is the "fuzzification" process using a membership function to convert the real data into fuzzy-logic input data. This feature converts complex algebraic calculations into simpler logical operations. For example, the appearance × times of a term in each document which is counted as analog values from zero to a maximum, is fuzzified to a truth grade $A(x)$ between 1 and 0 by a membership function $\mu_A(x)$ for a linguistic label such as "many" or "quite a few".

A second feature of fuzzy logic is the fuzzy logic operation using MIN, MAX of truth grades for logical product (AND) and logical sum (OR) of the fuzzysets. The AND and OR operations correspond to a calculation of the possibility of the occurrence of both events A and B at a given time, and the possibility of the occurrence of event A or B at a given time, respectively. The negation or complement of A, i.e. A', is taken to be 1−A, although alternatives are available should they be more advantageous to use.

A third feature of fuzzy logic is the fuzzy-logic inference using the "if-then" rule. The expression for fuzzy-logic inference is described by K. K. Thornber in an article entitled "A New Look at Fuzzy-Logic Inference" in the Proc. of FUZZIEEE '92, pages 271–278 (1992) and in another article entitled "A Key to Fuzzy-Logic Inference" in Int. J. Approx. Reason., 8, pages 105–121 (1993). The "if-then" rule is expressed by the following implication:

$$\text{if A then C: A} \rightarrow \text{C or A'} \vee \text{C} \tag{1}$$

Assuming the rule truth grade $A \rightarrow C$ is R, $\max(A',C)$ must be R. Thus, if $A'<R$, then C must be R. Thornber deigned the data fidelity fd in an article entitled "The Role of Fidelity in Fuzzy-logic Inference" in the Proc. of FUZZIEEE '93, pages 938–943, (1993), and in another article entitled "The Fidelity of Fuzzy-Logic Inference," in IEEE Transactions on Fuzzy Systems, 1, pages 288–297, (1993) to show how C=R is valid, as follows:

$$\text{if R>A'; fd=R−A', otherwise; fd=0.} \tag{2}$$

Thus, if fd>0, C is inferred to be R. The fidelity fd is used to show the degree of validity of the inference result. The calculation in Eq. (2) is called the bounded difference operation. Using the bounded difference operation $\ominus$, the data fidelity is expressed as $fd=R \ominus A'$ where the operation means that if $R>A'$, then $fd=R-A'$ and otherwise, $fd=0$.

This definition for fuzzy logic inference is convenient for expanding the single stage inference to a multiple stage transitive inference. Assume that rule truth grade for $A1 \rightarrow C1, A2 \rightarrow C2, \ldots,$ and $An \rightarrow Cn$ are $$[A1 \rightarrow C1]=R1, [A2 \rightarrow C2]=R2, \ldots, [An \rightarrow Cn]=Rn \tag{3}$$

and that the output of one inference becomes the input of the next inference as follows:

$$A2=C1, A3=C2, \ldots, \text{and } An=Cn-1. \tag{4}$$

Since the ith stage inference result Ci is Ri when $$Ri > Ai' = (1-A_i) = (1-R_{i-1}), i=2,3,\ldots,n \quad (5)$$

the final inference result of the chain becomes $[Cn]=Rn$, so long as $$A1 > 1-R1. \quad (6)$$

Since the data fidelity of the inference of each stage is $$fdi = Ri - (1-Ai) = Ri + R_{i-1} - 1, i=2,3,\ldots,n \quad (7)$$

and $fd1 = R1 - (1-A1)$, the overall data fidelity of transitive inference becomes:

$$fd = \min_i\{fd1, fd2, \ldots, fdi, \ldots, fdn\} \quad (8)$$

A fourth feature of fuzzy logic resides in the defuzzification process to return the fuzzy-logic inference results C(y) back to the real data y. Using [A(×)] and R, the inference result C(y) becomes R when fd>0. The data y is estimated from [C(y)] and the membership function $\mu_c(y)$. The defuzzification process becomes important when there are two or more rules.

When $Aj \rightarrow Cj(y) = Rj$, $j=1,2,\ldots,m$ exist, the input Aj forces fidelities fdj, $j=1,2,\ldots,m$ to be output. That is, C(y) becomes Rj at the fidelity:

$$fdj = Rj \ominus Aj'. \quad (9)$$

Assume that Cj(y) has a truth grade Rj when y=yj. Then, the optimal y is estimated as follows:

$$y = \Sigma_j f_{dj} \cdot y / \Sigma_j f_{dj}. \quad (10)$$

The operator "." means an algebraic product or a logical product, and likewise "Σ" means an algebraic sum or a logical sum. Of course, it must be assumed that $\Sigma_j f_{dj}$ does not become zero for possible input × in the system. Since $fdi = Rj \ominus Aj'$ is obtained frown the membership function Rj, Eq. 10 is similar to the centroid method.

In the present invention, the fuzzy-logic operation is used in the estimation of the similarity between each query pattern and the filed patterns, and transitive fuzzy-logic inference is used to quickly find the closest filed pattern for the query pattern from the hierarchical categorized filed patterns. Then, the following conditional transitive inference rules are used instead of Eq. (3).

$$[A1 \rightarrow C1] = R1, [A2 \wedge C1 \rightarrow C2] = R2, \ldots,$$
$$[An \wedge Cn-1 \rightarrow Cn] = Rn. \quad (11)$$

The inference is performed in the same manner as Eq. (6)

$$[C1] = R1 \text{ if } R1 > [A1]', [Cj] = Rj \text{ if } Rj > [Cj-1 \wedge Aj]', [Cn] = Rn \text{ if } fd > 0$$
$$fd = \min(R1 - [A1]', Rj - [Cj-1 \wedge Aj]'), j=2,3,\ldots,n.$$

This computational possibility is implemented by VLSI hardware algorithms to realize quick retrieval and automatic fast preparation of rules.

SUMMARY OF THE INVENTION

In order to reduce the time required for document retrieval in a full-text search processor, two methods using fuzzy logic are implemented. A first method using fuzzy logic treats search results as term-match-grade patterns and stores all document search results as filed patterns. The closest pattern is determined on the basis of fuzzy logic matching between a query pattern and the filed patterns.

A second method using fuzzy logic categorizes the filed patterns by area specific term sets and cluster center patterns. In order to estimate the closest filed pattern area and cluster, a fuzzy-logic inference from the term match grade volume and similarity between the query and cluster center pattern are used. The closest document addresses are provided from a ranker FIFO in order of decreasing data fidelity.

In accordance with the teachings of the present invention, there are two methods for determining the rule truth grade. The first method is to determine the rule truth grade so that the data fidelity $$fd1 = R1 + [A1] - 1, fdj = Rj + [Cj-1 \wedge Aj] - 1, j=2,3,\ldots,n$$

can be zero when [Aj] is less than the minimum $\alpha_j$ of Aj. Thus, the rule truth grade Rj is defined as follows:

$$R1 = \max([A1]',[C]) = 1 - \alpha_1, Rj = \max([Cj-1 \wedge Aj]',[Cj]) = 1 - \alpha_j, j=2,3,\ldots,n.$$

The second method is to make the rule truth grade $R1 = \max([A1]',[C]) = [C1]$, equal to 1. $Rj = \max([Cj-1 \wedge Aj]', [Cj]) = [Cj], j=2,3,\ldots,n$, is made equal to 1 so that $[A1]'$ or $[Cj-1 \wedge Aj]'$ can become less than 1 by introducing the thresholds $ftl = \alpha_l$, $ftj = \alpha$ for the antecedent truth grade A1,A2, ..., An. Then, the data fidelity can become:

$$fdl = R1 - [A1]' - ftl = [A1] - ftl, fdj = Rj - [Cj-1 \wedge Aj]' - ftj = [Cj-1 \wedge Aj] - ftj.$$

In this case, fdl or fdj becomes zero when Al, Aj becomes less than $ftl = \alpha_l$, $ftj = \alpha_j$.

The transitive fuzzy-logic inferences based on the fidelity are used for the nearest document search in the categorized documents. Then, the realization of these inferences are shown by the VLSI hardware algorithm to provide quick retrieval and automatic fast rule preparation.

The advantages of transitive fuzzy-logic inference reside in the flexible decision capability to find the nearest items from many combinatorial categories and in a filtering function to skip the search of categories not likely to contain the closest items.

Another advantage of the transitive fuzzy-logic inference is in the capability to expand the hierarchical categorization tree by using additional stages of the same structure.

A further advantage of the transitive fuzzy-logic inference is in the capability to learn the category inference rules for the hierarchical categorization from a ranker FIFO via α or β memories.

A primary advantage of the document retrieval system resides in the high versatility. The system can be used not only to find the closest filed pattern addresses using a field pattern memory (FPM), a pattern similarity calculator (PSC) and ranker FIFO (First-in First-out buffer memory), but also to do a full-text search of all filed documents in disk file memory (DFM) using only a string search processor (SSP) and a term match signal counter (MSC).

Another advantage of the system resides in the function to select the best term set by ranking the match grade amount ΣGij/n in a ranker FIFO, the function to determine the nearest cluster by ranking the similarity Sqk in the ranker FIFO, and the function to seek the nearest pattern addresses by ranking the similarity Sqr in the ranker FIFO.

A further advantage of the system resides in the capability to make the area or cluster code inference rules while the filed documents are stored in the filed pattern memory (FPM) based on the categorization flow.

A principal object of the present invention is therefore, the provision of transitive fuzzy-logic inference which results in flexible decision capability in order to find the closest documents from many combinational categories and to filter the search of categories not likely to contain the closest document.

Another object of the invention is the provision of transitive fuzzy logic inference to enhance the capacity to learn inference rules for hierarchical categorization.

A further object of the invention is the provision of a ranking mechanism to determine the closest match by ranking the similarity of a cluster and term match grade.

A still further object of the invention is the provision of a mechanism for making area or cluster code inference rules while documents are being filed and stored in a filed pattern memory based on a categorization flow.

Further and still other objects of the present invention will become more clearly apparent when the following description is read in conjunction with the accompanying drawing.

DETAILED DESCRIPTION OF THE INVENTION

Figure 1:
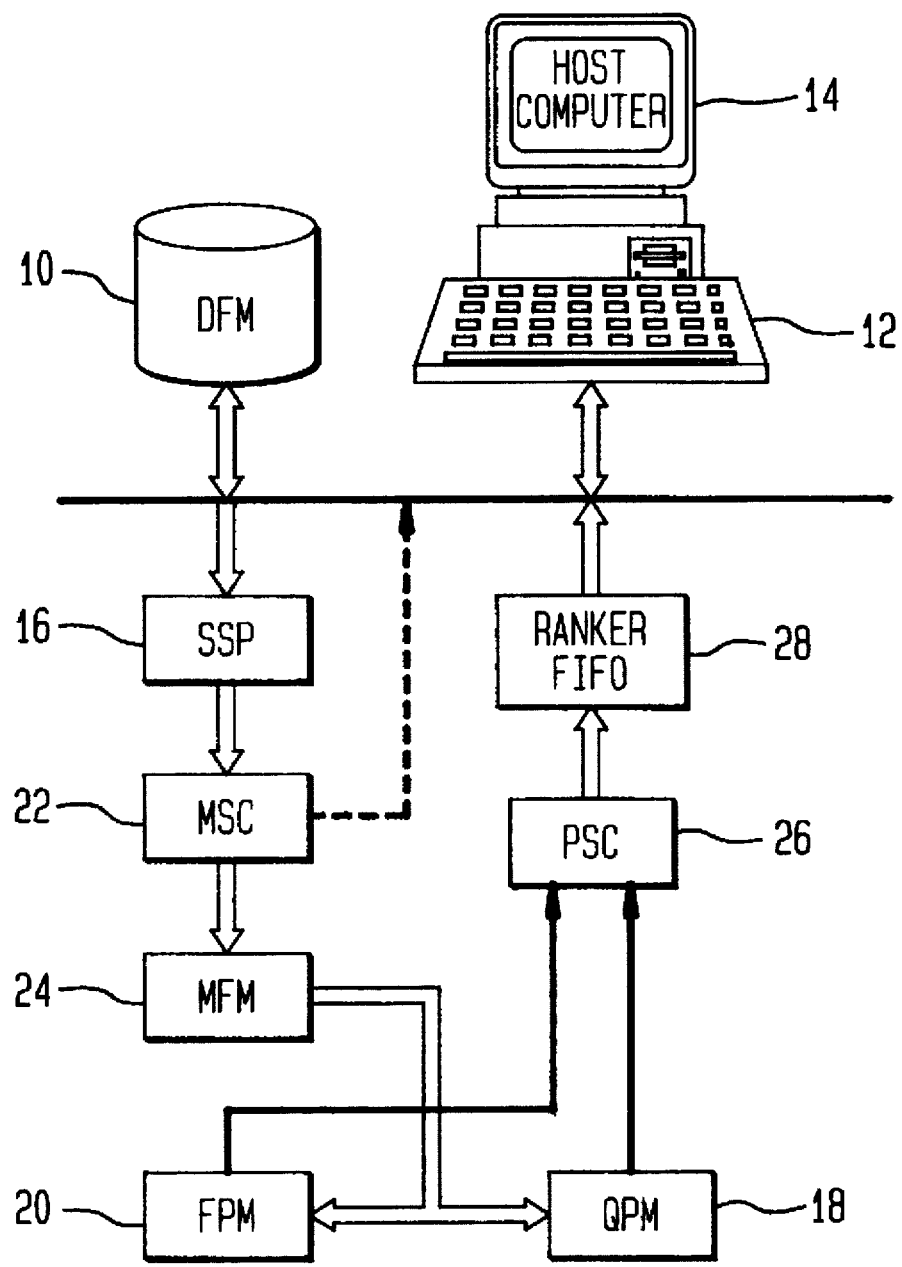
FIG. 1 is a schematic block diagram of a closest document retrieval system.

FIG. 1 shows a schematic block diagram of a closest document retrieval system. Documents are stored in a large capacity disc file memory (DFM) 10. Each document is transferred from the DFM 10 to a host computer 12 before it is displayed on a computer screen 14. While the document is being transferred from DFM, the text of the document can be searched by a string search processor (SSP) 16. Before the text document is searched, search terms Ti, i=1,2, . . . , n are entered into the SSP from the best computer. The SSP conducts parallel string matching between the document and the search terms stored in the SSP. The SSP shows where each of the search terms are contained in the documents. Exemplary SSPs are described in U.S. Pat. No. 4,958,377 issued to K. Takahashi and entitled "Character String Identification Device with a Memory Comprising Selectively Accessible Memory Areas" and in U.S. Pat. No. 4,979,101 issued to K. Takahashi and entitled "Apparatus for Retrieving Character Strings". Both of these patents are hereby incorporated herein by reference.

The search terms stored in the SSP are chosen from a sample document. The documents are filed in the DFM as a set of terms. Some of the terms in the set are stored in the SSP. After the search terms are sent to the SSP, the SSP is used to check which search terms are contained in the query document. The search result is sent to the query pattern memory (QPM) 18 or to the filed pattern memory (FPM) 20 through a term match signal counter (MSC) 22 and a membership function memory (MFM) 24.

In this system, two strategies are introduced in order to shorten the total closest document search time. The first strategy is to store the search results of all filed documents in the filed pattern memory (FPM), even though the FPM would require a capacity greater than 1 Gbytes. Then, the query document searched by the SSP is converted to a query pattern by the MSC and MFM and sent to the QPM. The query pattern is compared with the filed patterns stored in the FPM by a pattern similarity calculator (PSC) 26.

The output of the PSC is sent to a ranker FIFO (First-in First-out buffer memory) 28. The ranker FIFO ranks the similarities and the corresponding filed pattern addresses in order of magnitude. Since a typical ranker FIFO can output 16 or more similarities and the addresses at a rate of approximately 10 Mch/s or more, the ranker FIFO will not lengthen the closest document search time.

Figure 2:
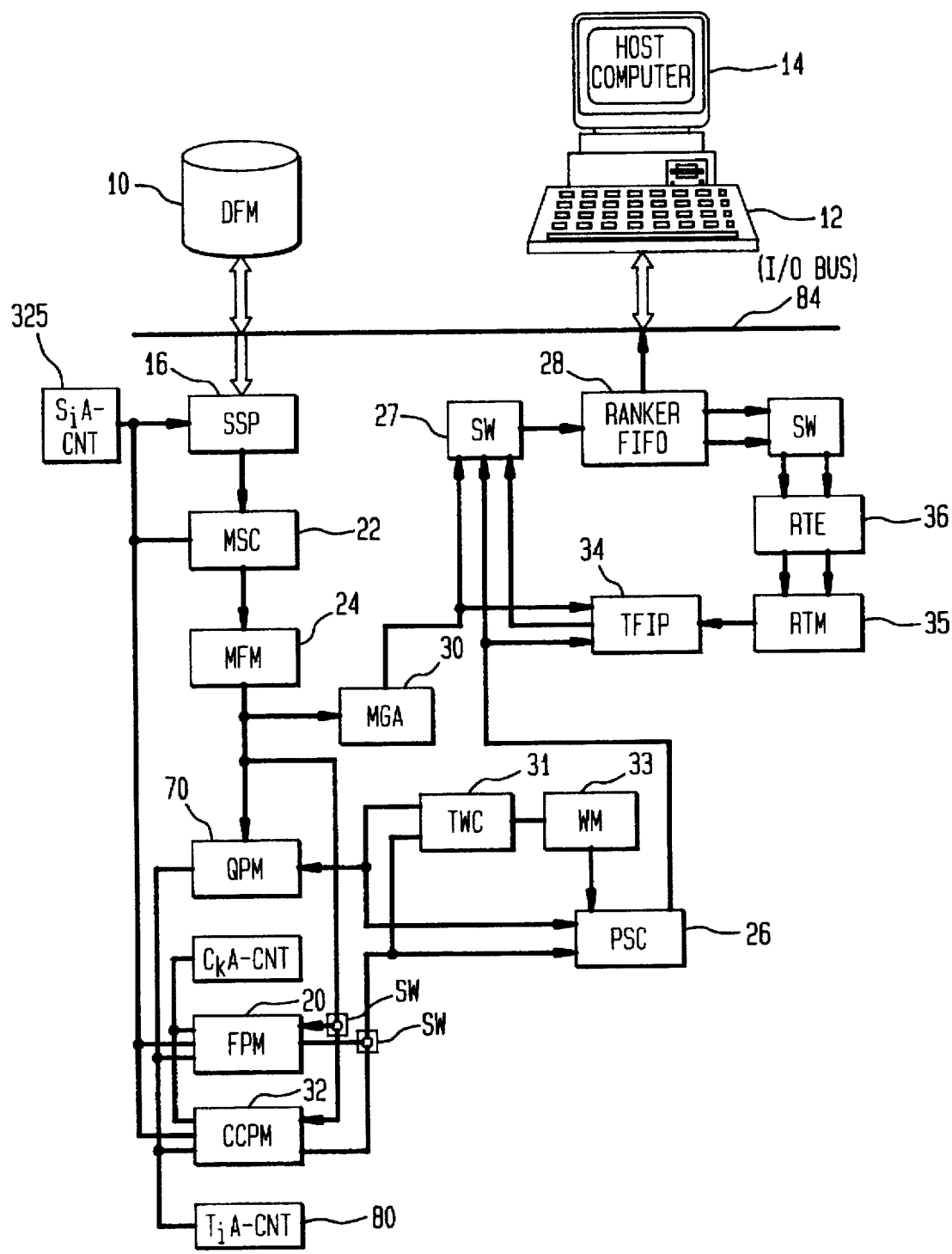
FIG. 2 is a schematic block diagram of a preferred embodiment of a closest document retrieval system.

The second strategy is to categorize hierarchically filed patterns into several areas and several clusters by the term match amount and by the similarities and then to use the transitive fuzzy-logic inference for inferring the closest area and cluster. Thus, a match grade accumulator (MGA) 30, a cluster center pattern memory (CCPM) 32, a transitive fuzzy-logic inference processor (TFIP) 34 and a rule truth grade extractor (RTE) 36 are added to the circuit as shown in FIG. 2.

The closest document addresses in the areas and clusters are arranged in order of magnitude of the data fidelity by ranker FIFO 28. Since the filed patterns in mismatched areas and clusters are not searched, the overall search time becomes very short, e.g. approximately 1 or 2 seconds.

In accordance with the first strategy of storing search results of all filed documents in a filed pattern memory FPM, details of the elements of the system will now be described in detail.

When the query document Dq is compared with the filed documents Dj, j=1,2, . . . ,m by the search terms Ti, i=1,2, . . . ,n stored in the SSP, it is not possible to directly compare the query document Dq with the filed document Di.

Initially, a document Di is searched by the SSP in order to store a set of search terms. Next, document Dq is searched by the SSP. Then, the search results of Dq and Di are compared with each other in the PSC.

Figure 3:
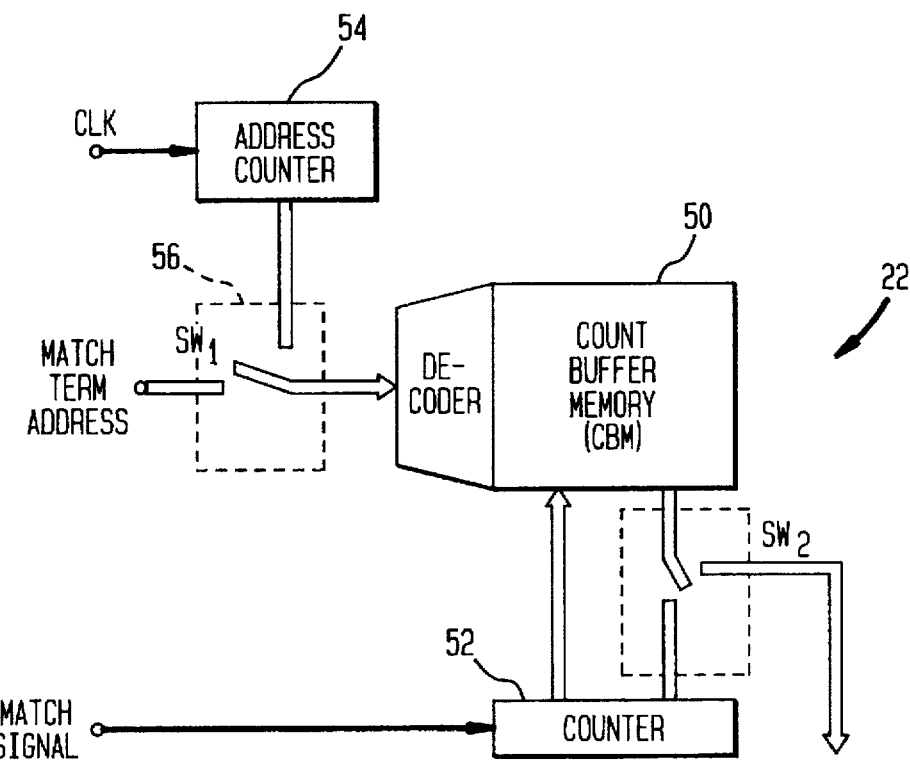
FIG. 3 is a schematic block diagram of a match signal counter (MSC)

In order to convert the outputs of the SSP to a term match frequency, the match signal counter (MSC) 22 comprises a count buffer memory (CBM) 50 and a counter 52 as shown in FIG. 3. Since the output of the SSP 16 comprises match term addresses and term match signals, whenever a term match signal is provided as an output from the SSP, the contents of CBM 50 activated by the match term address, is read out and sent to the counter 52 in parallel. Then, the match signal is provided as an input to the counter 52 in order to increment the match signal count. The counter 52 contents are written back into the CBM 50 at the same term match address. When the document search is completed, the contents of the counter 52, whose address is provided from a term address counter 54 through the switch 56, becomes the term match signal counts Xij, i=1,2, ... ,n in the jth document. The signal count Xij is preferably normalized per document size, for example per 100 KB.

Figure 4:
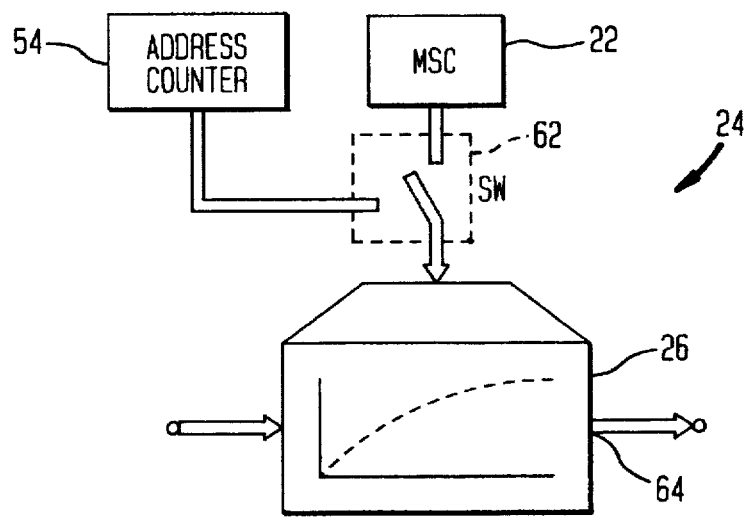
FIG. 4 is a schematic block diagram of a membership function memory (MFM)

The term match counts Xij, i=1,2, ... ,n, j=1,2, ... ,m are fuzzified to the grade Gij, i=1,2, ... ,n, j=1,2, ... ,m by use of the membership function G(Xij) stored in the membership function memory (MFM) shown schematically in FIG. 4. An example of membership function is as follows:

$$G(Xij) = 1 - \exp(-\beta Xij) \quad (12)$$

or $$G(Xij) = 1 - \frac{1}{(1+\beta Xij)} \quad (12')$$

where $\beta$ is an arbitrary positive constant which can be chosen to maximize the effectiveness of G. When $\beta$ is 0.5, the former equation becomes 0.39 at Xij=1, 0.63 at Xij=2, and 0.78 at Xij=3, respectively. When $\beta$ is 1, the latter becomes 0.5 at Xij=1 and 0.67 at Xij=2. As Xij increases, the match grade G(Xij) approaches 1.0. This conversion from Xij to G(Xij) is called a fuzzification. When the above function is stored as a look-up table in the MFM 24, the values Xij, i=1,2, ... ,n are input sequentially to the address port 60 of the MFM 24 via switch 62 and the associated grade values G(Xij), i=1,2, ... ,n, j=1,2, ... ,m are output from the data port 64 of MFM 26. The resultant output of MFM 26 is stored in the QPM 18 for the query document Dq or in the FPM 20 for the filed documents. The result is regarded as a vector pattern of term match grades.

Pattern similarity estimation is performed using fuzzy grade matching logic. The comparison of query document Dq and filed documents Dj is replaced by the comparison of the term match grade patterns Gq and Gj in the QPM and FPM. Conventional retrieval systems rely upon the host computer to carry out this term match grade pattern comparison and as a result, fail to avoid performance deterioration. Table 1 shows examples of Gq and Gj corresponding to the Dq and Dj.

TABLE 1

|  |  | T1 | T2 | T3 | T4 | T5 | T6 | T7 | T8 |  |  |
|---|---|---|---|---|---|---|---|---|---|---|---|
| Dq → | Gq = | 0.0 | 0.5 | 0.7 | 0.9 | 0.0 | 0.6 | 0.0 | 0.9 | → | QPM |
| Dj → | G1 = | 0.9 | 0.8 | 0.7 | 0.5 | 0.0 | 0.0 | 0.6 | 0.7 | → | FPM |
|  | G2 = | 0.7 | 0.5 | 0.9 | 0.9 | 0.0 | 0.5 | 0.0 | 0.6 | → | FPM |
|  | G3 = | 0.0 | 0.7 | 0.0 | 0.5 | 0.0 | 0.8 | 0.9 | 0.0 | → | FPM |
|  | G4 = | 0.0 | 0.7 | 0.6 | 0.5 | 0.9 | 0.8 | 0.0 | 0.5 | → | FPM |
|  | G5 = | 0.5 | 0.7 | 0.0 | 0.6 | 0.8 | 0.0 | 0.9 | 0.7 | → | FPM |
|  | G6 = | 0.9 | 0.6 | 0.7 | 0.0 | 0.9 | 0.8 | 0.0 | 0.0 | → | FPM |
|  | G7 = | 0.8 | 0.0 | 0.8 | 0.5 | 0.7 | 0.0 | 0.6 | 0.7 | → | FPM |
|  | G8 = | 0.0 | 0.5 | 0.8 | 0.0 | 0.7 | 0.8 | 0.9 | 0.9 | → | FPM |

Figure 5:
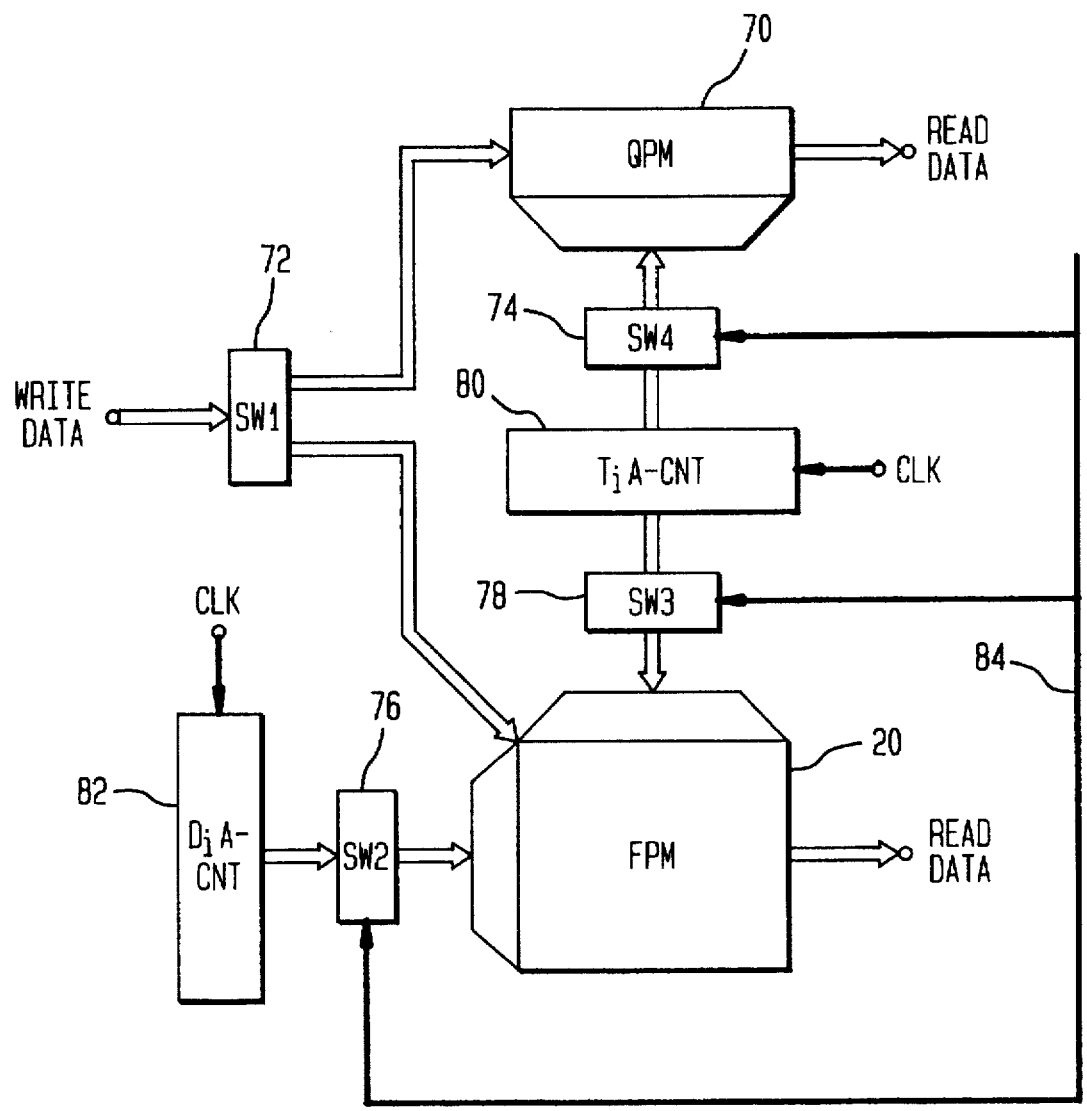
FIG. 5 is a schematic block diagram of a query pattern memory (QPM) and filed pattern memory (FPM) configuration.

The query pattern Gq is stored in QPM 70 and the filed patterns Gj, j=1,2, ... are stored in FPM 20 in FIG. 5. FPM requires a large memory capacity while QPM requires a smaller memory capacity. Each memory has associated address switches 74, 76 and 78 to provide either a term address (TiA) from TiA-CNT 80, a document address (DjA) from DjA-CNT 82 or a specified address from the host computer 12 through the I/O bus 84. Thus, QPM 70 stores the term match grade Giq at each term at each term address TiA. FPM 20 stores term match grade Gij at the ith term address TiA and the jth filed pattern address DjA.

Each memory also has a data switch 72 to select either the QPM 70 or FPM 20 to store the output of MFM 24 through the R/W data ports of the QPM 70 and FPM 20. Particularly, in the write (W) mode of memory operation, the outputs of TiA-CNT 80 and DjA-CNT 82 are used as memory write addresses.

Figure 6:
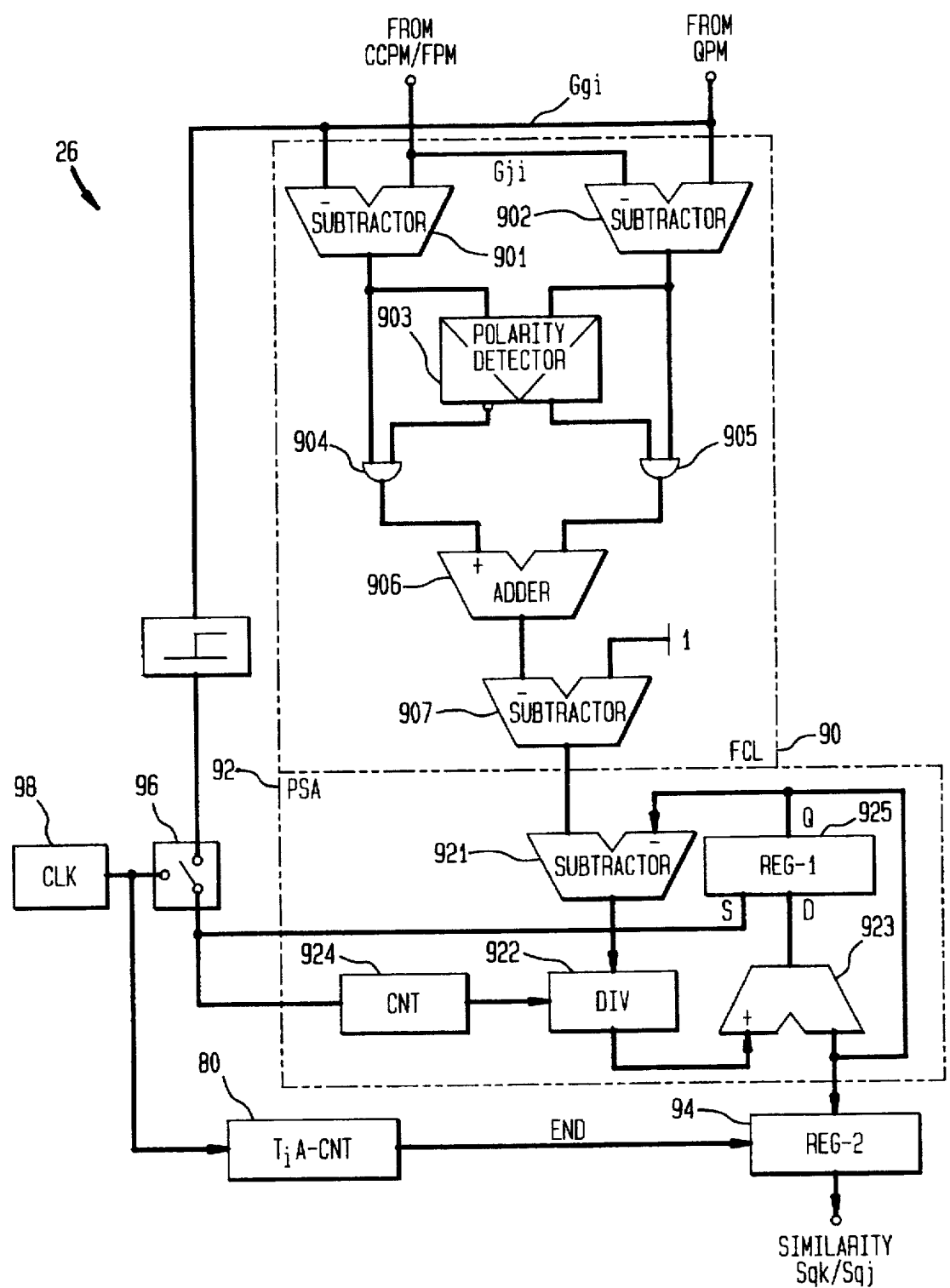
FIG. 6 is a schematic block diagram of a pattern similarity calculator (PSC)

FIG. 6 is a schematic block diagram of a pattern similarity calculator PSC 26 using a fuzzy coincidence logic circuit FCL 90 to calculate the similarity between the term match grade patterns Gq and Gj, j=1,2, ... m stored in QPM 70 and FPM 20. In the pattern similarity calculator PSC 26, the pattern similarity between Gq and Gj is calculated as follows:

$$Sjq=1-\Sigma_i\{(Giq\ominus Gij)\vee(Gij\ominus Giq)\}/n \quad (13)$$

where $Giq\ominus Gij$ means a bounded difference of Giq and Gij, that is, the bounded difference becomes Giq–Gij when Giq is larger than Gij, otherwise it becomes zero. The $(Giq\ominus Gij)\vee(Gij\ominus Giq)$ means an absolute value of the difference between the term match grades Giq and Gij.

Thus, fuzzy coincidence logic FCL 90 can be realized with a subtractor 901 to form (Gij–Giq), and subtractor 902 to form (Giq–Gij), a difference polarity detector 903, data switches 904, 905 and adder 906 to form the bounded difference $(Giq\ominus Gij)\vee(Gij\ominus Giq)$ and subtractor 907 to calculate Eq. (13).

The pattern similarity accumulator 92 is used to form the average of the outputs of the FCL 90. The accumulator (PSA) 92 includes a subtractor 921, divider 922, adder 923, counter 924, and register 925.

Assume that the average of i−1 coincidence grades Si, i=1,2, ... ,i−1 coming from FCL 90 is expressed by ASi−1=Σi Si−1/i−1 and a new input coincidence grade is expressed by Si. The average of Si is calculated recursively as follows:

$$\begin{aligned}ASi &= ASi-1+\{Si-ASi-1\}/i \\ &= \{(i-1)\Sigma_i Si - 1/(i-1)+Si\}/i\end{aligned} \quad (14)$$

where $Si=1-(Giq\ominus Gij)\vee(Gij\ominus Giq)$. The subtractor 921 calculates the similarity of the input Si and the average ASi−1. The similarity is sent to the divider 922 to be divided by i in the binary counter 924. Then, the content of divider 922 is added to the average ASi−1 at the adder 923. The result is stored in the register 925, which is equal to Eq. (14). The counter 924 is incremented whenever Si is input together with a clock signal or Mi=1. In general, recursive calculation is convenient because the calculation process is not complicated.

Finally, when all term addresses have been scanned, the contents of register 925 is transferred to the register 94. The set signal is provided from the TiA-CNT 80 equal to count n.

Referring to FIG. 6, in order to permit a search of the filed pattern by only search terms contained in the query, the output of FGMCLU can be masked by the polarity Mi of term match grade Giq in the query pattern:

$$Mi=SGN(Giq) \quad (15)$$

where a signum function means that if A>0 then SGN(A)=1 and otherwise SGN(A)=0. Thus, only when Mi is 1 is the output of FCL 90 added to the register content in the register 925 of the accumulator (PSA) 92. This makes it possible to calculate the similarity with respect to only the search terms contained in the query document. Of course, if the masking by Mi is not required, Mi can always be kept to 1 by the CLK switch 96 being connected to the CLK generator 98.

Tables 2 and 3 show the term coincidence grade based oil the conventional fuzzy coincidence logic $(Giq \wedge Gij) \vee (Giq' \wedge Gij')$ and the new fuzzy coincidence logical $1-(Giq \ominus Gij) \wedge (Gij \ominus Giq)$. These tables show that the latter conforms well with an intuitive sense, when compared with the former.

TABLE 2

| Giq\Gij | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 1.0 | 0.9 | 0.8 | 0.7 | 0.6 | 0.5 | 0.4 | 0.3 | 0.2 | 0.1 | 0.0 |
| 0.1 | 0.9 | 0.9 | 0.8 | 0.7 | 0.6 | 0.5 | 0.4 | 0.3 | 0.2 | 0.1 | 0.1 |
| 0.2 | 0.8 | 0.8 | 0.8 | 0.7 | 0.6 | 0.5 | 0.4 | 0.3 | 0.2 | 0.2 | 0.2 |
| 0.3 | 0.7 | 0.7 | 0.7 | 0.7 | 0.6 | 0.5 | 0.4 | 0.3 | 0.3 | 0.3 | 0.3 |
| 0.4 | 0.6 | 0.6 | 0.6 | 0.6 | 0.6 | 0.5 | 0.4 | 0.4 | 0.4 | 0.4 | 0.4 |
| 0.5 | 0.5 | 0.5 | 0.5 | 0.5 | 0.5 | 0.5 | 0.5 | 0.5 | 0.5 | 0.5 | 0.5 |
| 0.6 | 0.4 | 0.4 | 0.4 | 0.4 | 0.4 | 0.5 | 0.6 | 0.6 | 0.6 | 0.6 | 0.6 |
| 0.7 | 0.3 | 0.3 | 0.3 | 0.3 | 0.4 | 0.5 | 0.6 | 0.7 | 0.6 | 0.7 | 0.7 |
| 0.8 | 0.2 | 0.2 | 0.2 | 0.3 | 0.4 | 0.5 | 0.6 | 0.7 | 0.8 | 0.8 | 0.8 |
| 0.9 | 0.1 | 0.1 | 0.2 | 0.3 | 0.4 | 0.5 | 0.6 | 0.7 | 0.8 | 0.9 | 0.9 |
| 1.0 | 0.0 | 0.1 | 0.2 | 0.3 | 0.4 | 0.5 | 0.6 | 0.7 | 0.8 | 0.9 | 1.0 |

TABLE 3

| Giq\Gij | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 1.0 | 0.9 | 0.8 | 0.7 | 0.6 | 0.5 | 0.4 | 0.3 | 0.2 | 0.1 | 0.0 |
| 0.1 | 0.9 | 1.0 | 0.9 | 0.8 | 0.7 | 0.6 | 0.5 | 0.4 | 0.3 | 0.2 | 0.1 |
| 0.2 | 0.8 | 0.9 | 1.0 | 0.9 | 0.8 | 0.7 | 0.6 | 0.5 | 0.4 | 0.3 | 0.2 |
| 0.3 | 0.7 | 0.8 | 0.9 | 1.0 | 0.9 | 0.8 | 0.7 | 0.6 | 0.5 | 0.4 | 0.3 |
| 0.4 | 0.6 | 0.7 | 0.8 | 0.9 | 1.0 | 0.9 | 0.8 | 0.7 | 0.6 | 0.5 | 0.4 |
| 0.5 | 0.5 | 0.6 | 0.7 | 0.8 | 0.9 | 1.0 | 0.9 | 0.8 | 0.7 | 0.6 | 0.5 |
| 0.6 | 0.4 | 0.5 | 0.6 | 0.7 | 0.8 | 0.9 | 1.0 | 0.9 | 0.8 | 0.7 | 0.6 |
| 0.7 | 0.3 | 0.4 | 0.5 | 0.6 | 0.7 | 0.8 | 0.9 | 1.0 | 0.9 | 0.8 | 0.7 |
| 0.8 | 0.2 | 0.3 | 0.4 | 0.5 | 0.6 | 0.7 | 0.8 | 0.9 | 1.0 | 0.9 | 0.8 |
| 0.9 | 0.1 | 0.2 | 0.3 | 0.4 | 0.5 | 0.6 | 0.7 | 0.8 | 0.9 | 1.0 | 0.9 |
| 1.0 | 0.0 | 0.1 | 0.2 | 0.3 | 0.4 | 0.5 | 0.6 | 0.7 | 0.8 | 0.9 | 1.0 |

Figure 7:
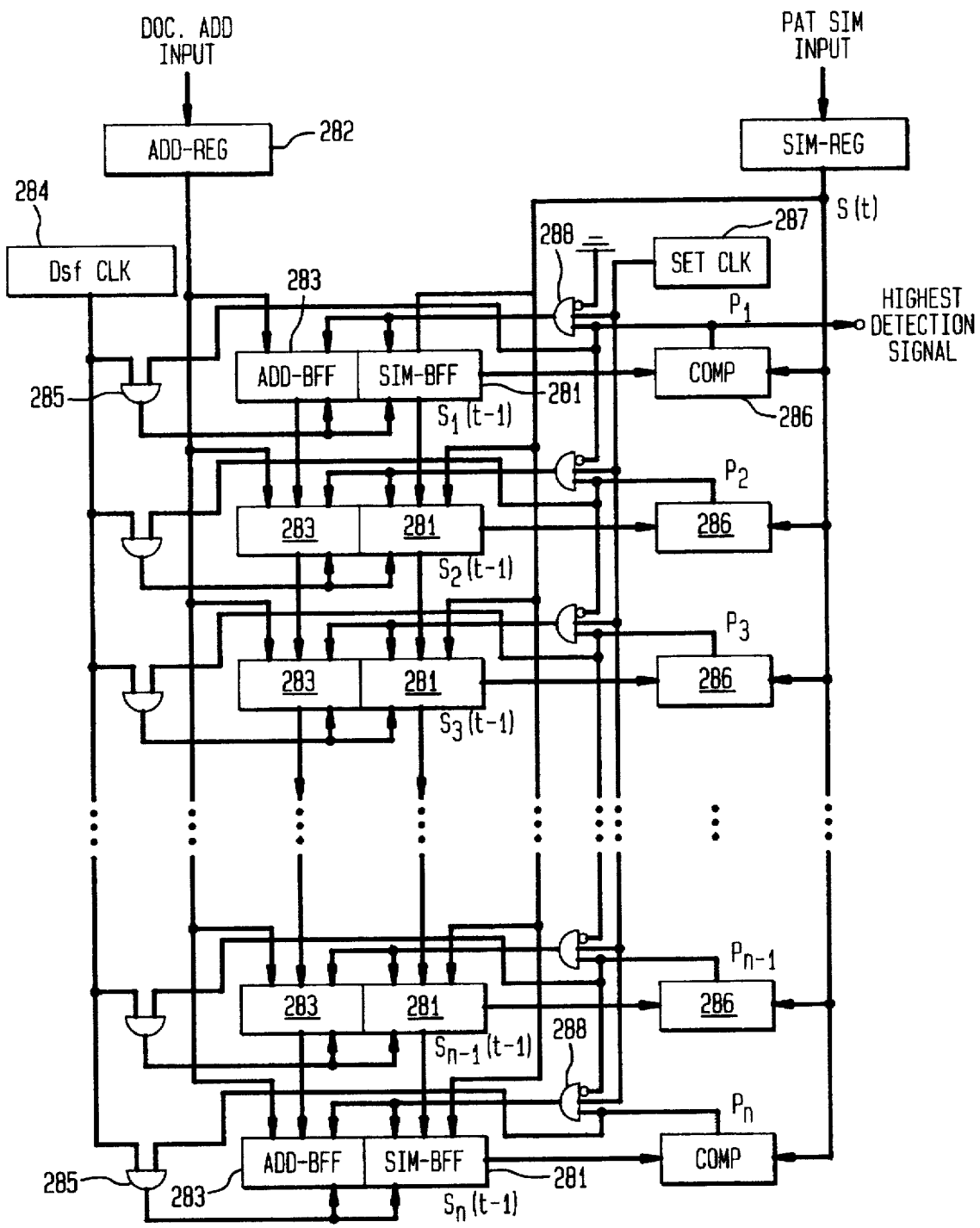
FIG. 7 is a schematic block diagram of a ranker FIFO circuit.

FIG. 7 is a schematic diagram of a ranker FIFO circuit for a closest pattern search. For example, if coincidence logic is applied to the example of Gq and Gj, j=1,2, . . . ,8 shown in Table 1, the following Sjq, j=1,2, . . . ,8 can be calculated by using the equation (13).

$$S1q=(0.1+0.7+1.0+0.6+1.0+0.4+0.4+0.8)/8=4.8/8=0.60$$

$$S2q=(0.3+1.0+0.8+1.0+1.0+0.9+1.0+0.7)/8=6.7/8=0.84$$

$$S3q=(1.0+0.8+0.3+0.6+1.0+0.8+0.1+0.1)/8=4.7/8=0.59$$

$$S4q=(1.0+0.8+0.9+0.6+0.1+0.8+1.0+0.6)/8=5.8/8=0.72$$

$$S5q=(0.5+0.8+0.3+0.7+0.2+0.4+0.1+0.8)/8=3.8/8=0.47$$

$$S6q=(0.1+0.9+1.0+0.1+0.1+0.8+1.0+0.1)/8=4.1/8=0.51$$

$$S7q=(0.2+0.5+0.9+0.6+0.3+0.4+0.4+0.8)/8=4.1/8=0.51$$

$$S8q=(1.0+1.0+0.9+0.1+0.3+0.8+0.1+1.0)/8=5.2/8=0.65$$

S2q is the highest value 0.84. Then, it is possible to check the "closeness" of Dq and D2 by the contents. Certainly, the Gq and G2 are very similar as shown below.

Gq=0.0 0.5 0.7 0.9 0.0 0.6 0.0 0.9  G2=0.7 0.5 0.9 0.9 0.0 0.5 0.0 0.6→Sq2=0.84

It is possible to conclude that the described method of determining similarity is reasonable, because Gq is similar to G2 when Sq2 is large. This is a good example of the use of fuzzy logic for determining the similarity of documents.

In order to find the maximum pattern similarity between the query Dq and filed documents Dj, the similarity Sjq, j=1,2, . . . ,m is input to the ranker FIFO shown in FIG. 7. That is, after the similarities between Dq and Dj, j=1,2, . . . ,m are sequentially input to the ranker FIFO 28, the similarities and their addresses are stored in sequence of magnitude from the greatest similarity to the least similarity in the ranker FIFO 28.

The ranker FIFO comprises an array of registers which are called address buffer (Add-Buf)/similarity buffers (Sim-Buf), comparators (Comp), similarity register (Sim-Reg), address register (Add-Reg) and data setting CLK generator (SetCLK) and down/up shifting CLK generator (DsfCLK).

In FIG. 7, when the input similarity is greater than the similarities stored in all Sim-buffers 281, the input similarity is written in the top Sim-buffer after the Add-/Sim-buffer contents is down shifted. Then, the content of Add-Reg 282 is latched in the Add-Buff 283. When the input similarity is smaller than either of the buffer contents, the input is not stored in the buffers 281. When the input similarity is between the (k−1)th and the kth Sim-buffer's contents, the similarity and the contents of Add-Reg 282 are written in the kth Add-buffers 283 and the kth Sim-buffers 281, respectively, after the kth to the nth Add-/Sim-buffers' contents are down-shifted. The clock generator (DsfCLK) 284 produces the timing signals to down-shift the contents of Add-Bff 283 and Sim-Bff 281 through AND gate 285 when the comparators 286 generate a signal "1" to show that the input similarity is greater than the content of Sim-Bff 281.

Alternatively, the clock generator (SetCLK) 287 activates the conditional AND gates 288 to show the comparator position where the input similarity is between the (k−1)th and kth Sim-buffer's contents. Finally, by driving the Dsf-CLK in the reverse direction, the contents stored in the buffers are shifted up to be output after N similarities are ranked in the array of the Add/Sim-buffers. The corresponding document file addresses are output in the same order as the similarities. The highest ranked similarity and the corresponding address can be checked from the top position Sim-Bff 620 and Add-Bff 610 without the upshift clock after N similarities are ranked in the array of the Add/Sim-buffers. In addition, during the ranking process, the ranker FIFO can output the HD (highest detection) signal. It is useful to know which input similarity has the highest value.

The ranked similarity output process is performed as described above. That is, the addresses of filed patterns similar to the query are ranked in the same order as the similarity, as shown in Table 4.

TABLE 4

| Output similarities | | | |
|---|---|---|---|
| Sq1 = 0.60 | Sq2 = 0.84 | Sq3 = 0.59 | Sq4 = 0.72 |
| Sq5 = 0.47 | Sq6 = 0.51 | Sq7 = 0.51 | Sq8 = 0.65 |
| Ranked similarities | | | |
| Sq2 = 0.84 → | Sq4 = 0.72 → | Sq8 = 0.65 → | Sq1 = 0.60 → |
| Sq3 = 0.59 → | Sq7 = 0.51 → | Sq6 = 0.51 → | Sq5 = 0.47 |

(the ranked addresses forms a sequence of 2 4 8 1 3 7 6 5)

The contents stored in the ranker FIFO can be output by using the up-shift clock. Although the address j corresponds to the greatest similarity and Sjq becomes the closest document address for the query document Dq, if the ranker FIFO contains 16 buffer registers, the 16 closest document addresses are output in order of decreasing similarity magnitude. These addresses are output from the ranker FIFO to the host computer 12.

Using the FPM and the ranker FIFO, the closest document address search time can be reduced to the search time necessary to compare the query Gq with all the filed patterns Gj, j=1,2, ... ,m stored in the FPM. When the comparison time is 1 μsec, the time is n·m μsec, where m and n are the numbers of filed patterns and search terms. When m and n are $10^6$ and $10^3$, it becomes $10^3$ sec. Furthermore, the preparation time of FPM will range to m·s μsec, where s is the size of each document. When s is $10^5$ bytes, m·s μsec becomes $10^5$ sec (28 hours). Although the time is very long, this preparation is needed only when the filed documents or the search term sets are updated.

In order to reduce the time for performing comparisons between each query pattern and every filed patterns, filed patterns in the FPM are categorized.

This categorization is done when the documents are filed. Thus, the following two layer categorization rules are assumed. First, the document is categorized in the ith document area, if it matches a set of search terms for the lth area documents and does not match a set of search terms for the non-lth area filed documents. Second, several cluster center documents are chosen in each document area. Then, the similarity between the other filed documents and each cluster center candidate document is calculated. If the similarity to the kth cluster center document is large, the filed document is categorized in the kth cluster, otherwise it is not categorized into the kth cluster.

When filed documents are stored as filed patterns in the FPM based on these categorization rules, the query document can be classified in the cluster to store the filed documents based on the above categorization rules.

The method of accomplishing the filed document categorization is described below. First, the filed documents are roughly categorized based on the filing contents, such as mathematics, physics, biology, art, cognitive-science, history, geography, astronomy, agriculture, industry, ecology, information-technology, device technology and the like.

Next, each file is categorized into L areas by the detailed contents. For example, the information-technology can be categorized into sub-categories such as the computation hardware or software, communication network hardware or software, filing system hardware or software and the like. Each area will be decomposed into smaller clusters. Suppose that each area is decomposed in K cluster based on the similarity to cluster center candidate documents or to the others (miscellaneous). It is noted that area and cluster are the temporal names for hierarchical categorization. They can be considered the first layer and second layer categories. For the categorization of filed documents, the cluster center documents should be as typical of the documents as possible. For example, such a document will be parts of handbooks regarding the filed documents or the text books or the term dictionaries. These documents have a term index. The term set can be determined from the term index. The handbook parts can be optimized by knowing the distribution of filed document contents or by searching the filed documents with the SSP to store the sample term sets.

These documents can be stored in the DFM 10. The corresponding filed pattern can be stored in the string search processor SSP 16. The SSP has a parallel character string matching function to compare 128 or less strings (terms) with an input text string, and has the selective comparison function to compare either of 16 term sets (128 string/set) with an input text string in one chip. Thus, using the SSP to store L sets of search terms and a K cluster center pattern memory, the query document can be compared with the filed documents categorized into L×K clusters in such a macro category as information-technology.

This invention can be used for very wide range library retrieval and specified area document retrieval. In either document retrieval case, the filed documents are hierarchically categorized. Then, first, they are categorized by the term sets into L=16 areas. Second, the documents in each area are categorized into K clusters with the same term set.

The term set common to K cluster documents in the Lth area is selected from the cluster center patterns in the Lth area. The set is stored in the lth CAM area of the SSP. The procedure to categorize the documents which are stored as filed patterns in FPM is as follows:

First, the SSP stores L terms sets and the cluster center documents are converted into the cluster center patterns. They are stored in the cluster center pattern memory CCPM 32 with selected segment address.

Second, the documents to be filed are searched by the SSP to store L term sets. When the search results are sent as query patterns to the QPB via MSC and MFM, ΣGij/n is checked by the match grade accumulator MGA. This ΣGij/n is sent to the ranker FIFO. In the ranker this FIFO, the segment address 1 corresponding to the largest ΣGij/n is indicated by HD signal. When the ranker FIFO outputs the HD signal, the query pattern is transferred from QPB to the QPM 70 and the FPM 20.

Third, the query pattern buffered in the QPM is compared with k cluster center patterns in the CCPM 32 with the selected lth segment address, using the PSM. When k is scanned, the largest similarity can be detected by the ranker FIFO 28. If the similarity of the query to the kth cluster center pattern is the greatest, the query pattern is categorized in the kth cluster. Thus, the filed pattern address is stored in the DjAM in association with the lth segment address code and the kth cluster addresses code in sequence.

If the largest similarity detected by the ranker FIFO is very small, then the query pattern will be categorized in the miscellaneous class. Then, the similarity threshold must be optimized so that the documents in each cluster and those in the miscellaneous cluster are well balanced.

After all filed documents are stored in the FPM, the query document can be easily classified by the ΣGiq/n and the similarity Sqk. Then, transitive fuzzy-logic inference is used.

The sum of term match grades between the query document and lth set of search terms can be used to infer the search domain SDl of the query.

The similarity of Sqk between the query and the kth cluster center pattern in SDl can be used to infer the cluster Ck of the query pattern. Assume that the kth cluster contains R filed patterns. The similarity Sqr between the query and the rth filed pattern FPr in Ck call be used to decide the nearest pattern NPr, r=1,2, ... ,R.

Thus, fuzzy-logic inference rules are assumed as follows:

$$[\Sigma Gliq/n \rightarrow SDl] = Rl \text{ lth term set select} \quad (16)$$

$$[SDl \wedge Sqk \rightarrow Ck] = Rk \text{ kth center pattern select} \quad (17)$$

$$[Ck \wedge Sqr \rightarrow NPr] = Rr \text{ rth filed pattern select} \quad (18)$$

where Rl, Rk and Rr are the rule truth grades of ΣGliq/n→SDl, SDl∧Sqk→Ck and Ck∧Sqr→NPr.

As described previously, there are two methods for determining the rule truth grades such as Rl, Rk, and Rr. The first method is to define the rule truth grade as follows:

$$Rl = 1 - \min\{\alpha_r, \alpha_t\} \quad (19)$$

$$R_k = k - \min\{\beta_{k'}, \beta_k\} \quad (20)$$

$$R_r = r - \min\{\gamma_{r'}, \gamma_r\} \quad (21)$$

where $\alpha_l$, $\beta_k$, and $\gamma_r$ are defined as $\min_j$ of the antecedent truth grade $\{\Sigma Glij/n, Sjk \text{ and } Sjr\}$ for the filed documents in categories l,k,r while $\alpha_{l'}$, $\beta_{k'}$, and $\gamma_{r'}$ are defined as $\max_j$ of the antecedent truth grade $\{\Sigma Glij/n, Sjk \text{ and } Sjr\}$ for the filed documents in the categories, except the specified categories l, k and r.

The second method is to set Rl, Rk and Rr to 1 by introducing thresholds $\min\{\alpha_{l'},\alpha_l\}$, $\min\{\beta_{k'},\beta_k\}$ and $\min\{\gamma_{r'},\gamma_r\}$ for the antecedent truth grades $\Sigma Gliq/n$, $SDl \wedge Sqk$ and $Ck \wedge Sqr$, respectively.

The first method decreases the rule truth grade Rl, Rk and Rr by $\min\{\alpha_{l'},\alpha_l\}$, $\min\{\beta_{k'},\beta_k\}$ and $\min\{\gamma_{r'}, \gamma_r\}$. The second method increases the threshold ftl, ftk and ftr by $\min\{\alpha_{l'},\alpha_l\}$, $\min\{\beta_{k'},\beta_k\}$, and $\min\{\gamma_{r'},\gamma_r\}$ in order to decide which categories will not be searched. If the data fidelity is not positive, the category is skipped, i.e. not searched. Otherwise, the category is searched.

For example, if the lth area documents have large values of $\Sigma Gij/n$ and the other area documents have small values of $\Sigma Gij/n$, because $\min_j \Sigma Gij/n = \alpha_l > \max_j \Sigma Gij/n = \alpha_{l'}$, and Rl becomes $1-\alpha_l$, then if $\Sigma Giq/n$ is less than $1-Rl=\alpha_l$, the lth area does not have to be searched. Otherwise, the lth area is searched. The lth area contains many clusters with kth cluster center patterns. The other rule truth grades Rk and Rr can be determined in the same scanner as Rl is determined.

Assuming that R filed patterns in each cluster call be categorized in more narrow sub-clusters SCz, $z=1,2,\ldots,Z$ by using the similarities between the filed pattern and sub-cluster center pattern, each sub-cluster will contain R/Z filed patterns. If Z is 32, R/Z also becomes 32. In the same manner, categorizing the filed patterns hierarchically, the search domain becomes narrower and narrower, though the inference rules increase.

These inference rules remind us of a fuzzy transitive inference from the query to infer the cluster containing the nearest filed patterns Fj. That is, the fuzzy-logic inference is performed as follows:

$$[SDl] = Rl \text{ whenever } fdql>0 \quad (22)$$

$$[Ck] = Rk \text{ whenever } fdlk>0 \quad (23)$$

$$[NPr] = Rr \text{ whenever } fdkr>0 \quad (24)$$

where, based on the first method for determining the rule truth grades, $$fdql = Rl \ominus [\Sigma Gliq/n]', l=1,2,\ldots,L \quad (25)$$

$$fdlk = Rk \ominus [SDl \wedge Sqk]', k=1,2,\ldots,K \quad (26)$$

$$fdkr = Rr \ominus [Ck \wedge Sqr]', r=1,2,\ldots,R \quad (27)$$

$$fdqr = \min(fdql, fdlk, fdkr) \quad (28)$$

and where, based on the second method for determining the rule truth grades, $$fdql = \Sigma liq/n - \min\{\alpha_{l'},\alpha_l\}, l=1,2,\ldots,L \quad (29)$$

$$fdlk = [SDl \wedge Sqk] - \min\{\beta_{k'},\beta_k\}, k=1,2,\ldots,K \quad (30)$$

$$fdkr = [Ck \wedge Sqr] - \min\{\gamma_{r'},\gamma_r\}, r=1,2,\ldots,R \quad (31)$$

$$fdqr = \min(fdql, fdlk, fdkr) \quad (32)$$

The values fdql, fdlk, fdkr and fdqr are the data fidelities of the inference results [SDl], [Ck], [NPr] and [SDl∧Ck∧NPr].

The clusters containing the documents nearest to the query are found by sending the fidelity fdqr to the ranker FIFO. At the last stage when R filed patterns in the kth cluster which are stored in the FPM are read out and compared sequentially with the query pattern, the filed pattern addresses providing the larger data fidelities are stored in the ranker FIFO 28 in order of magnitude.

The advantages of the transitive fuzzy-logic inference application to the closest document retrieval are in the filtering characteristics to skip the search of filed patterns in the mismatched categories and in the flexible decision characteristics to rank the nearest document addresses in order of data fidelity.

The filtering characteristics are obtained by cutting the consequent category searches based on zero data fidelity of the inference results. The flexible decision characteristics are accomplished by continuing the search for so long as the data fidelities are not zero. The high possibility solutions are stored in the ranker FIFO.

The nearest document retrieval system using the transitive fuzzy-logic inference can be realized using a circuit as shown in FIG. 2. The major difference between the circuits in FIG. 1 and FIG. 2 is the introduction of a match grade among calculator MGA 30, cluster center pattern memory CCPM 32, term weight calculator TWC 31, weight memory WM 33, transitive fuzzy inference processor TFIP 34, rule truth grade extractor RTE 36, and rule truth grade memory RTM 35.

Figure 8:
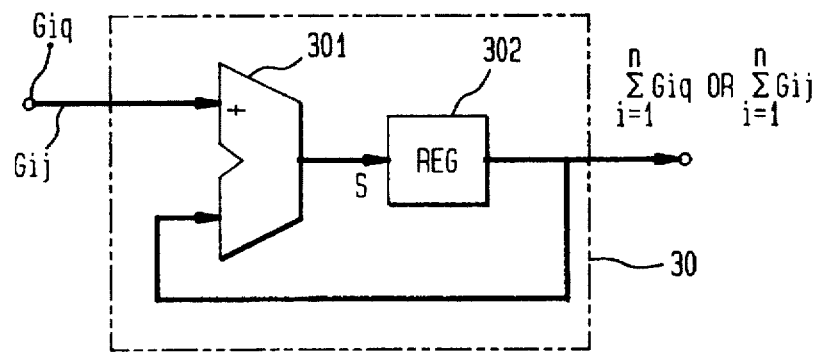
FIG. 8 is a schematic diagram of a match grade accumulator (MGA)

These hardware elements are explained below. The match grade accumulator MGA 30 is an accumulator for generating the sum of term match grades, as shown in FIG. 8. The MGA 30 comprises an adder 301 and a register 302 which receives as an input either grades Giq or Gij and provides as an output either $\Sigma Giq$ or $\Sigma Gij$, respectively.

Figure 9:
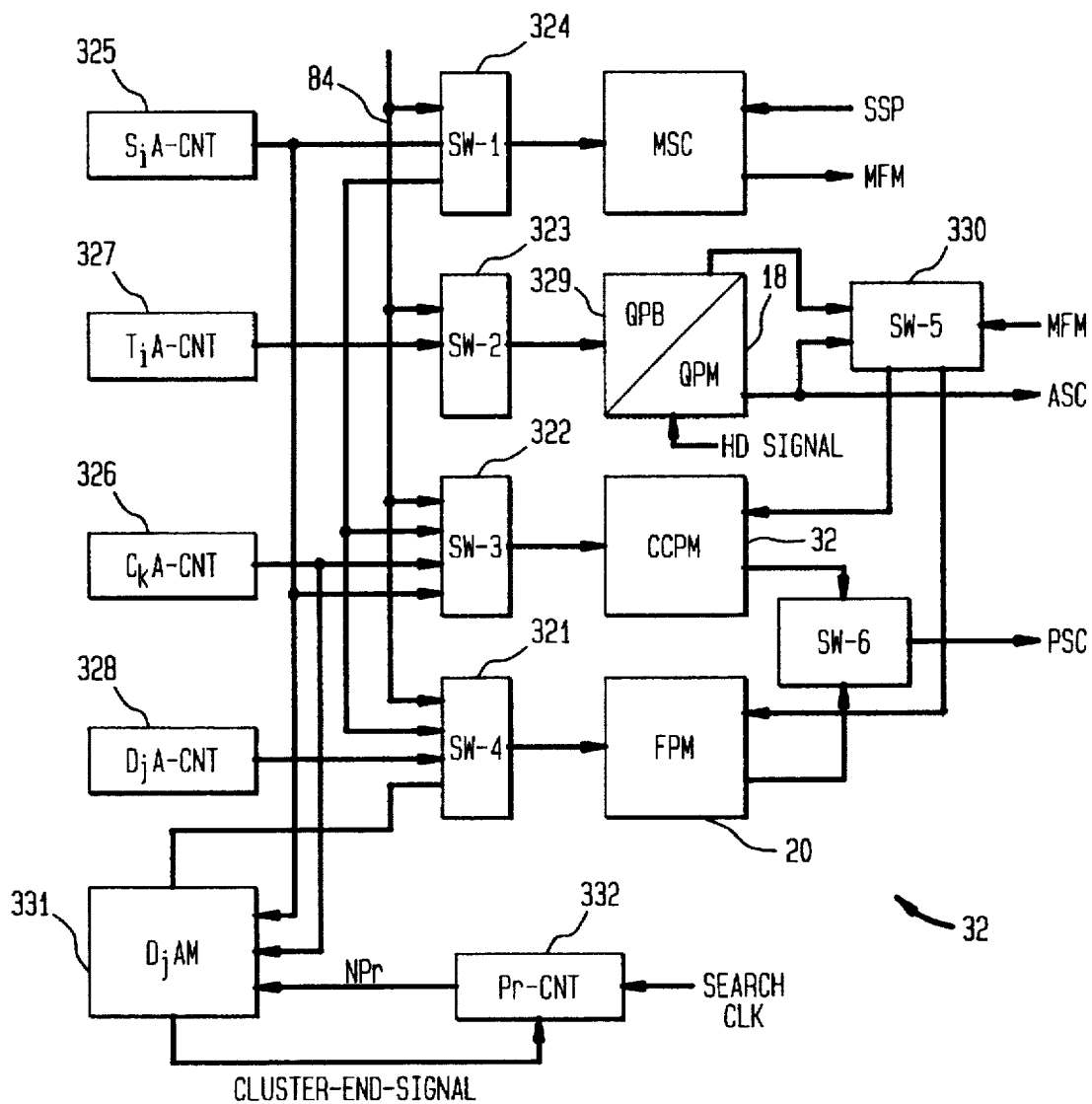
FIG. 9 is a schematic block diagram of a cluster center pattern memory (CCPM)

A schematic block diagram of a cluster center pattern memory CCPM 32 is shown in FIG. 9. The contents of QPM, FPM and CCPM are selected by the lth segment address coming from the SiA-CNT 325 to count the area number. In general, the lowest address code is TiA, next is CkA. The highest address code is the segment address SiA. The address switches 321 and 324 are used to select between the contents of address counters SiA-CNT 325, CkA-CNT 326, TiA-CNT 327 and DjA-CNT 328 or the specified address coming from the host computer 12 provided along bus 84.

In FIG. 9, a query pattern buffer (QPB) 329 is used to select the query pattern based on the best term set. The output of the MFM 24, provided via switch 330, is stored in the QPB 329. When HD (highest detection) signal is output from the ranker FIFO 28, the content of QPB is transferred to the QPM 18. The address of the FPM 20 is provided from the DjAM 331 until the Pr-CNT 332 is reset by the cluster end signal output from DjAM 331. Since the DjAM 331 stores the filed pattern address in sequence together with the lth segment and the kth cluster addresses, the filed pattern addresses can be generated by giving the lth segment and kth cluster addresses.

Next, the term weight calculation hardware 31 is explained. When the pattern similarity between the query and the categorized filed pattern is calculated in the PSC 26, the term contribution weights must be taken into account because the contribution of each search term to the filed patterns in each cluster is different from each other.

Figure 10:
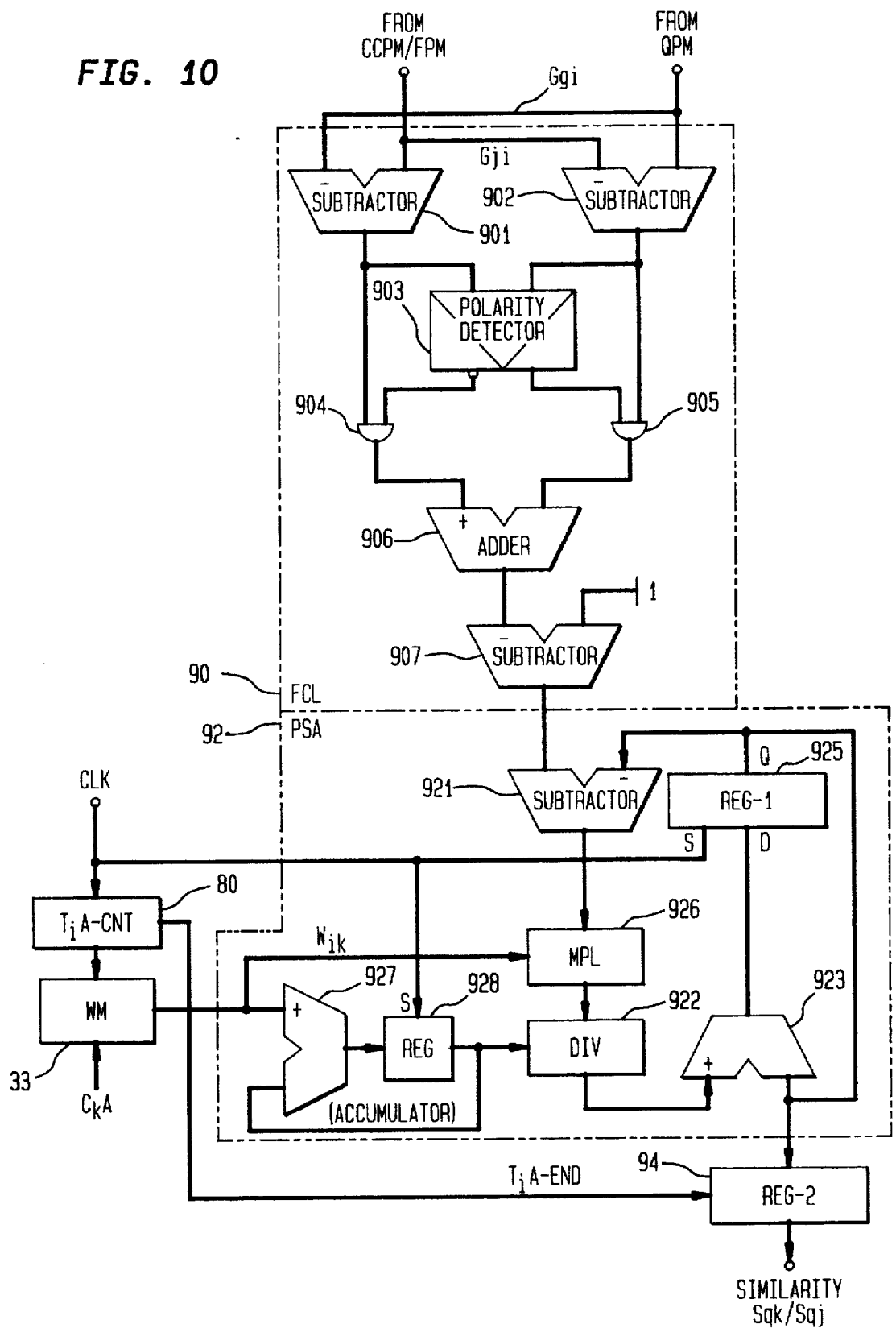
FIG. 10 is a schematic block diagram of a modified pattern similarity accumulator (PSA)

Thus, the PSC is modified as shown in FIG. 10. The weights are stored in the weight memory WM 33. The coincidence grade Ci between the query and the kth cluster center patterns center patterns is calculated as follows:

$$Ciqk = wik\{1 - |Gik - Giq|\} \quad (33)$$

where wik is the term weight for the kth cluster. The similarity Sqk is calculated by taking the average of Ciqk, i=1,2, . . . ,n. Assume that ACtqk is the normalized sum of Ctqk, t=1,2, . . . ,n−1. The ACtqk becomes:

$$ACtqk = AC(t-1)qk + \{Ctqk - wtk \cdot AC(t-1)qk\}/\Sigma wtk. \quad (34)$$

When t reaches n, ACtqk equals Sqk. Thus, the pattern similarity accumulator PSA 92 in FIG. 6 is modified to estimate recursively ACtqk as shown in FIG. 10.

Figure 11:
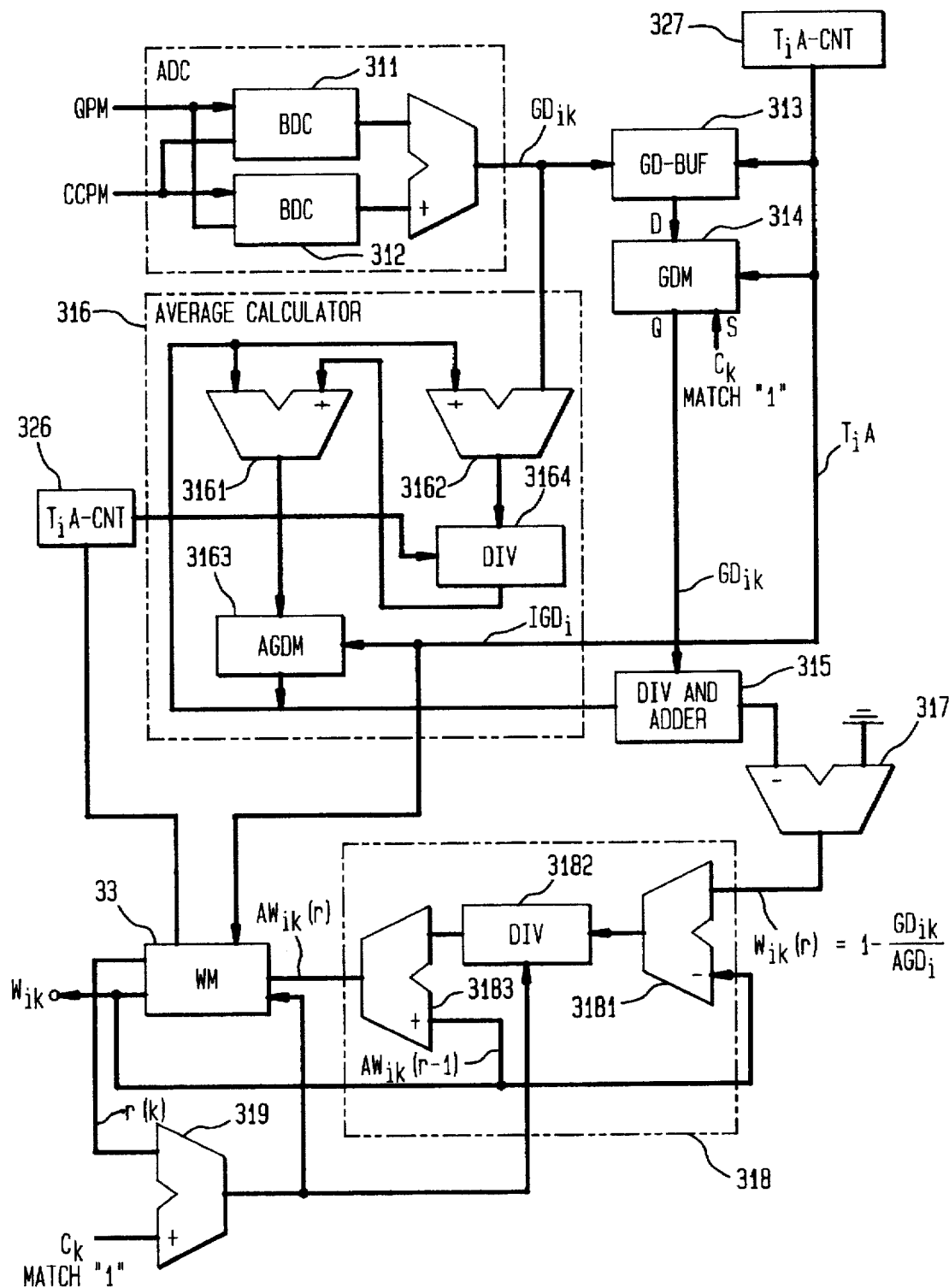
FIG. 11 is a schematic block diagram of a term weight calculator (TWC)

The weight memory contents prepared in the term weight calculator TWC shown schematically in FIG. 11, when the filed patterns are categorized into any of K clusters. The term weight wik is calculated as follows:

$$wik = \Sigma_r (1 - GDik/(AGDi + GDik)/\Sigma_r \quad (35)$$

where $GDik = \Sigma_r GDik$ is a grade difference between the kth cluster center pattern and the rth filed pattern in the lth cluster. AGDi is the average of GDik, k=1,2, . . . ,K. Assume that the average AWikt is the sum of Wikt, t=1,2, . . . ,r−1. The average AWikt becomes:

$$AWikt = AWik(t-1) + \{Wikt - AWik(t-1)\}/\Sigma r \quad (36)$$

where Wikt is $\{1-GDikt/(GDikt+AGDi)\}$, t=1,2, . . . ,r.

When t reaches r, AWikt equals wik. The term weight calculator TWC is shown schematically in FIG. 11. Two BDCs 311,312 are used to calculate the absolute value of the difference between Giq and Gik. The result is temporally stored in the GD-Buf 313. When the ranker FIFO 28 indicates the highest detection HD signal at the kth cluster, the content of GD-Buf 313 is transferred to the grade difference memory GDM 314. After k cluster center patterns are scanned, the GDM content is divided by the sum of AGDi and GDik at DIV and ADDER 315.

AGDi is calculated in the average calculator 316 containing two subtractors 3161, 3162 register AGDM 3163 and divider 3164, in the same manner as described in conjunction with the PSA 92 in FIG. 6. The output of DIV and ADDER 315 is subtracted from 1 in subtractor 317 and the result is averaged by the document number r in the kth cluster at the average calculator 318 containing the subtractor 3181, divider 3182 and adder 3183. The output of the adder 3183 is equal to wik when the document number in the cluster reaches r. The result is stored in WM 33. The document number r in each cluster is counted by adder 319, though the WM 33 must store the document number r(k) for each cluster.

Figure 12:
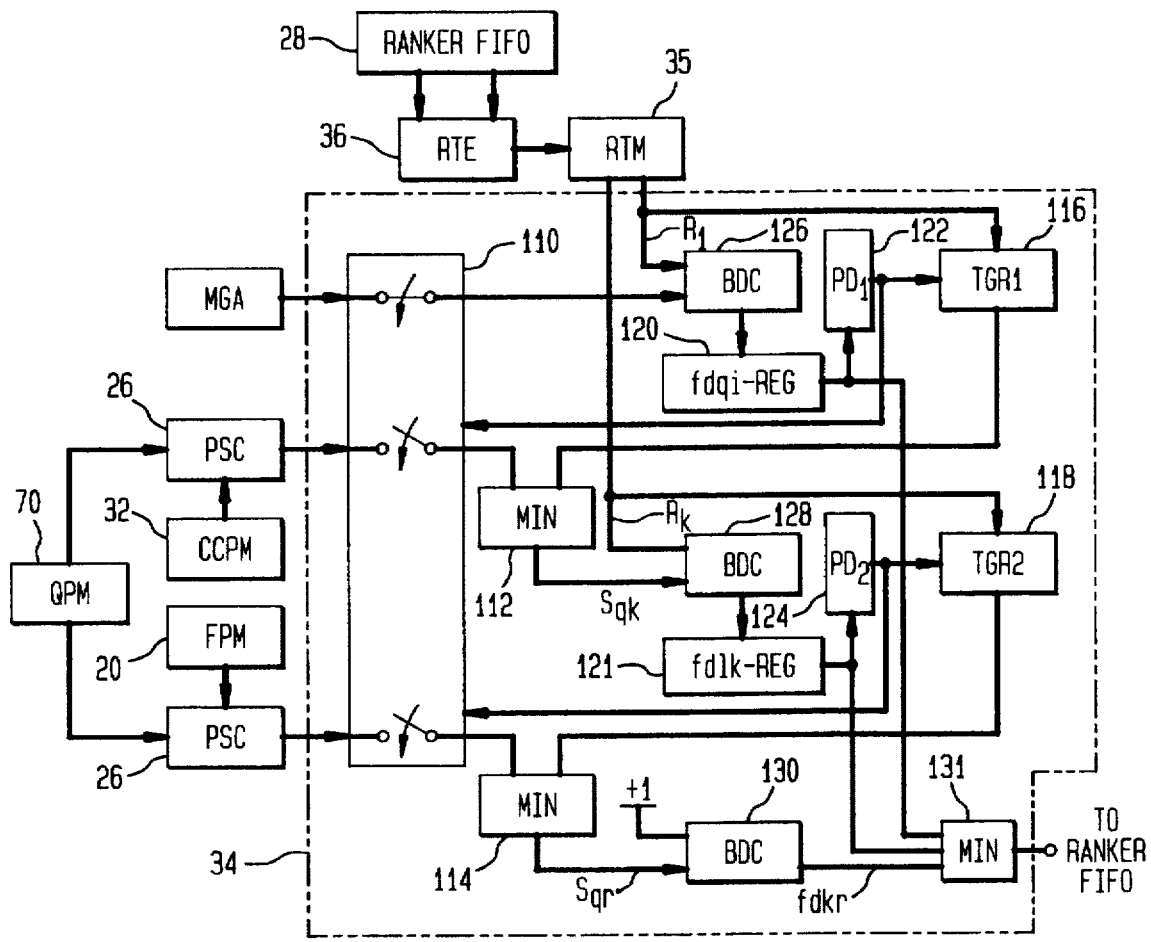
FIG. 12 is a schematic block diagram of a 3-stage transitive fuzzy-logic inference processor.

As shown in FIG. 12, TFIP 34 can be realized primarily with an input truth grade data switch 110, minimum selection circuits MIN 112,114, the output truth grade register (TRG1 or TRG2) 116,118, fidelity registers fd-Reg 120,121, polarity-detectors PD 122,124 and bounded-difference calculators BDC 126,128,130.

The BDC estimates the data fidelity fd and output truth grade which is the purpose of TFIP 34. The input truth grade is provided from the data switch 110 and the MIN 112,114 to select the minimum between the present input and the previous output truth grades. The result is compared with the rule truth grade provided from the rule truth grade memory RTM 35, to calculate the data fidelity such as fdlk=Rk−[Sqk∧SDl]'. The fidelity is stored in the fidelity register fd-Reg 120,121 and the polarity of the data fidelity is decided in the polarity detector PD 122,124. When the PD 122,124 outputs "1", the rule truth grade is latched in the truth grade register 116,118.

Figure 13:
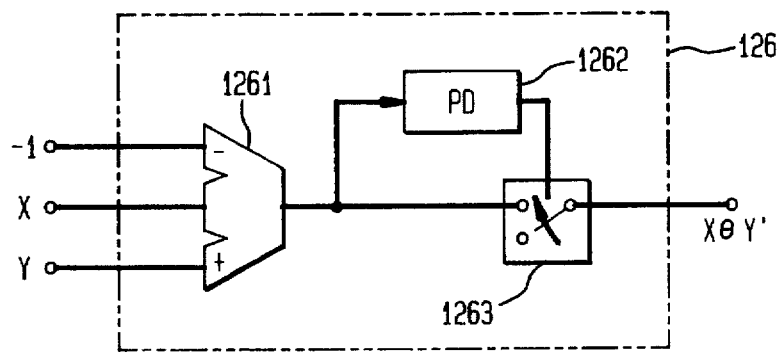
FIG. 13 is a schematic block diagram of a bounded difference circuit (BDC)

The BDC 128,128 is shown schematically in FIG. 13. The BDC comprises three input adder 1261, polarity detector 1262 and data switch 1263 which is controlled by the output from polarity detector 1262. If X+Y−1>0, the polarity detector 1262 output is a logic level "1" and switch 1263 is closed to pass through X⊖Y=X+Y−1. If X+Y−1<0, then polarity detector 1262 output is a logic level "0" and switch 1263 is open causing the output to be zero.

Figure 14:
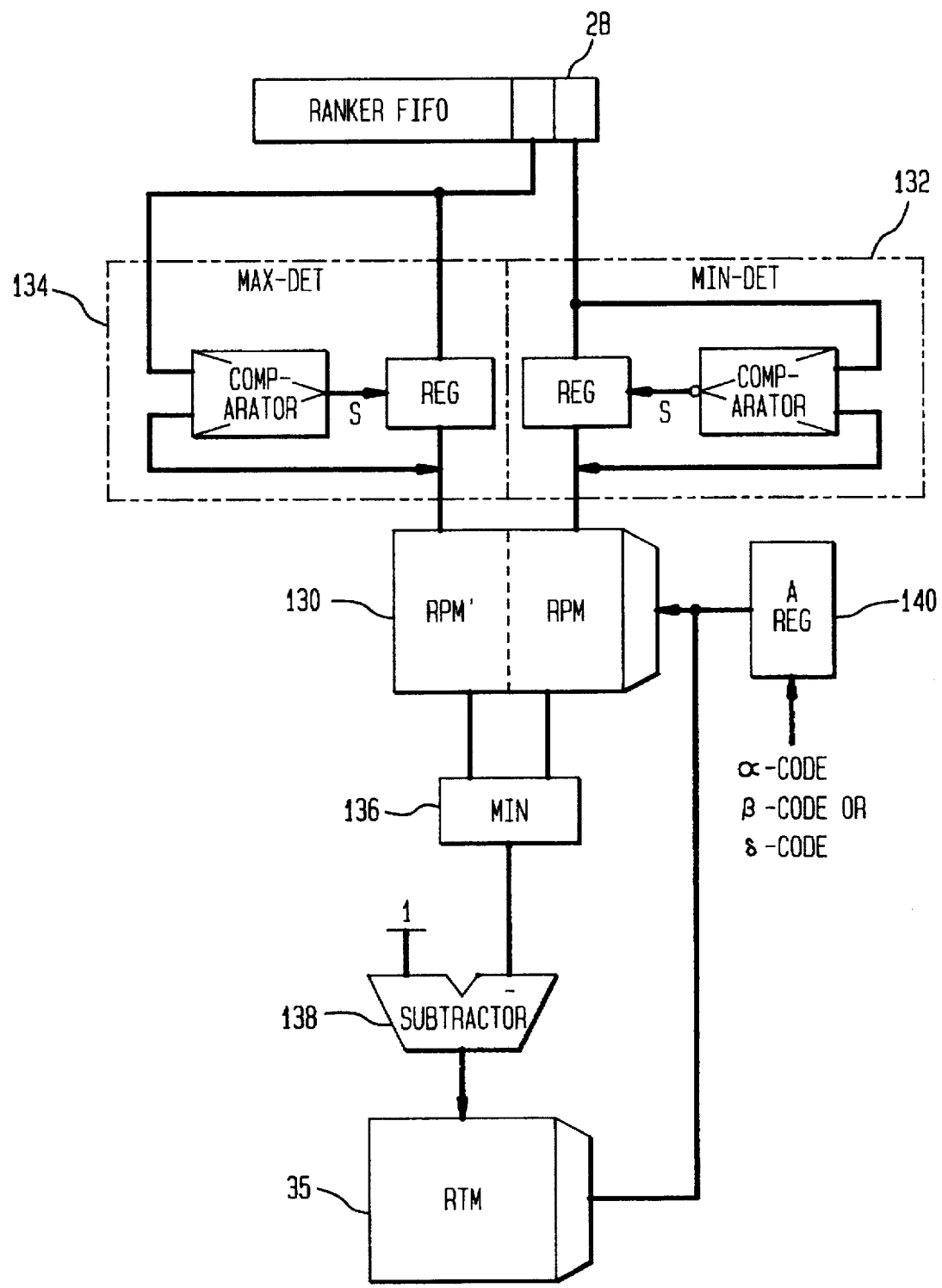
FIG. 14 is a schematic block diagram of a rule truth extractor (RTE)

The rule truth grade extractor RTE 36 is shown in FIG. 14. The RTE comprises rule parameter memory RPM/RPM' 130 which stores the category thresholds such as $\alpha_l$, $\beta_k$, $\gamma_r$, $\alpha_{l'}$, $\beta_{k'}$, and $\gamma_{r'}$ which are extracted from the ranker FIFO 28 through MIN detector 132 and MAX detector 134. The BDC 136 and subtractor 138 are used to calculate Eq. (19),(20) and (21). RPM may be divided in $\alpha$-M, $\beta$-M and $\gamma$-M to store $\alpha_l$, $\beta_k$, $\gamma_r$, $\alpha_{l'}$, $\beta_{k'}$, and $\gamma_{r'}$ by using the address register 140.

The transitive fuzzy-logic inference is carried out as shown by EQs (22),(23),(24), (25),(26), (27) and (28). The three layer transitive inference process is explained below.

The closest document retrieval system using the transitive fuzzy-logic inference processor TFIP is explained below. The system has two operation modes. The first mode is the filed document categorization and rule acquisition. The second mode is the query document classification and closest document address searching. The process is explained below.

In the first mode, the filed documents containing the cluster center candidate documents are searched by the SSP at the next sequence.

First step, the cluster center candidate documents are transferred to the host-computer and displayed. Then the search terms of the lth area are picked, filed as the lth area term set and stored in the SSP.

Second step, L×K cluster center candidate documents are searched by the SSP while l is incremented from 1 to L. The search results are buffered as a cluster center pattern in the QPB via MSC, MFM1 and the match grade accumulator MGA to calculate ΣGlij/n, until the segment address l to give the maxl ΣGlij/n is determined by the ranker FIFO. Whenever l is reached, the cluster center pattern is stored in the CCPM with the lth segment address. Then, the highest and the next values of ΣGlij/n, j=1,2, . . . ,L×K are stored as $\alpha_l$ and $\alpha_{l'}$ in the rule parameter memory RPM ($\alpha$-M) with the lth address activated, where $\alpha_l$=min$_j$ ΣGlij/n, and $\alpha_{l'}$= max$_j$ΣGl'ij/n. The symbols l' means "not l."

Third step, the other filed documents are sequentially searched by the SSP to store L term sets. When the search results of the filed documents are converted to the filed patterns through MSC 22, MFM 24, MGA 30 and QPB 329. The filed pattern buffered in the QPB 329 is transferred to the QPM 70 and FPM 20, when an HD signal is output from the ranker FIFO 28 to rank ΣGlij/n coming from the PSC 26.

Fourth step, the contents of QPM 70 is compared with the contents of CCPM 32 in sequence in PSC 26. The output of PSC 26 is sent to the ranker FIFO 28 via switch 27. When HD signal is output from the ranker FIFO, the cluster address and the lth segment address are used to decide the address of DjAM to store the filed pattern address. After the best k is determined, the highest and the second similarities in the ranker FIFO are sent to the rule parameter memory RPM/RPM' (β-M) in a form of βlk=min$_j$Sjk and βlk'= max$_j$Sjk'. The rule truth grade extractor RTE 316 converts the rule parameters ($\alpha_l$=min$_j$ΣGlij/n, $\alpha_{l'}$=max$_j$ΣGl'ij/n, βlk= min$_j$Sjk and βlk'=max$_j$Sjk') to the rule truth grades Rl and Rk are shown in FIG. 14.

Fifth step, when the filed documents in each area are hierarchically divided into the sub-categories such as clusters, the contribution of each term to the cluster are updated as the filed document is categorized, and stored as weight coefficients in the weight memory so that the weights can be used when the similarity of query document to the cluster center is calculated. The weight is calculated by the average calculator to give the average of each term match grades for the filed documents in each cluster, and thereby to calculate {1—the difference of the ith term match grades for the filed document and for the kth cluster center document}.

Sixth step, the contents of alpha and beta threshold memory in the rule parameter memory are sent to rule truth-grade extractor RTE 36 to estimate the rule truth grades using Eqs.(18) and (19). These six steps are used for the categorization of filed documents.

In the second operation mode of the closest document retrieval system, the query document is classified into some clusters suggested by the transitive fuzzy-logic inference, and then the filed patterns in the suggested clusters are searched to show the closest document addresses. The procedure is explained below.

First step, the query document is searched by the SSP 16 to store L term sets. The search result of SSP is sent to the QPM 70 via MSC 22, MFM 24 and MGA 30 to calculate $\Sigma Glij/n$.

Second step, the fuzzy-logic inference based on $[\Sigma Giq/n \rightarrow SDl]=Rl$ is used to check whether or not [SDl] is equal to Rl. Of course, if $Rl><[\Sigma Giq/n]'$, then [SDl]=Rl. Thus, the Transitive Fuzzy-logic Inference Processor TFIP 34 calculates the data fidelity $$fdql=Rl\ominus[\Sigma Gliq/n]'$$

using MGA to output the $\Sigma Gliq/n$ and the rule parameter memory RPM to store Rl, in the TFIP. The contents of RPM is determined in the RTE 36. If fdql is positive, [SDl]=Rl is stored in the first stage truth grade register TGR1.

Third, whenever fdql is positive, the content of QPM 70 is sequentially compared with k cluster center patterns stored in the FPM 20 with the lth segment address. Then, the similarity Sqk is sent to MIN 112,114 together with [SDl] stored in the TGR1. The output of the MIN is input to the BDC 128,130 together with the rule truth grade Rk stored in RPM 130. The BDC estimates [Ck]=Rk by calculating the data fidelity $$fdlk=Rk-[SDl \wedge Sqk]'.$$

When fdlk is positive, the inference result [Ck]=Rk is held in the second stage truth grade register TGR2.

The similarity is recursively calculated using weight wik, while the term number i is incremented, the similarity is calculated as follows:

$$Sqk=1-\Sigma wik(|Gik-Giq|)/\Sigma wik.$$

For this calculation of similarity, PSC is modified as shown in FIG. 10. The difference is in the pattern similarity accumulator 92. That is, the multiplier 926 is introduced between the subtractor 921 and the divider 922. The counter 924 is replaced by the weight accumulator 927. The weight is read out from the weight memory 33 with term address i.

Fourth step, when the data fidelity fdlk is positive, the content of the QPM is compared with all filed patterns stored in the FPM with the kth cluster address in the PSC. The resultant similarity Sqr is sent to the MIN together with the content of TGR2. When the data fidelity $fdkr=Rr-[Ck \wedge Sqr]'$ is positive, [NPr] is estimated to be Rr=1 based on the rule $Ck \wedge Sqr \rightarrow NPr$, because [Ck] stored in the TGR2 and the output of PSC are used to infer the truth grade [NPr] for the nearest pattern.

Fifth step, the data fidelity fdqr=min(fdql,fdlk,fdkr) is calculated in MIN 131 and sent to the ranker FIFO 28 together with the corresponding filed pattern address. Then, the cluster address k is incremented. If fdlk is not positive, r is not scanned and Sqr or fdkr is not calculated in PSC or BDC. The value k is incremented successively. When k reaches K, l is incremented. Similarly, if fdql is not positive, k is not scanned and fdlk is not calculated in TFIP 34. Until l reaches the maximum L, the above process is repeated. The output of the TFIP 34 is sent to the ranker FIFO 38, as long as the data fidelity is positive. At the end of the process, the nearest document address can be output from the ranker FIFO to the host computer 12.

The RTE 36 comprises rule parameter memory RPM and RPM' 130 to store $\alpha_l$, $\beta_k$, $\gamma_r$ and $\alpha_{l'}$, $\beta_{k'}$ and $\gamma_{r'}$ respectively, minimum and maximum selection circuits MIN detector 132 and MAX detector 134, a MIN circuit 136, subtractor 138 and rule truth grade memory RTM 35 as shown in FIG. 14. The rule parameters $\alpha_l$, $\beta_k$, $\gamma_r$ and $\alpha_{l'}$, $\beta_{k'}$ and $\gamma_{r'}$ are extracted from the ranker FIFO through MIN detector 132 and MAX detector 134. The MIN circuit and subtractor are used to calculate Eq.(19),(20) and (24). RTM 35 must store L×K×R inference rule truth grades. But, using the fact that Rr always becomes 1, RTM memory capacity becomes L×K bytes.

In general, if the filed documents can be categorized into narrower sub-clusters by the similarity to the sub-cluster center patterns, the query document can be classified into the narrower subclusters. In the same way, even each sub-cluster can be categorized into sub-sub-clusters. As the layers of hierarchical categorization increase, the search domain of the nearest patterns can be narrowed, resulting in the shorter search time. In this example, only two layers of categorization are shown. Even if the layers are two, the performance is markedly improved. When the filed document number m is $10^6$ per document file, two layers are enough to shorten the search time within a few seconds.

Rather in the first step of the query document classification, the search time of the query document L times by the SSP. If L SSPs are used in parallel to search the query document, the search speed is enhanced, because the search results can be processed in MSC in parallel without any collision. This is equivalent to the use of large capacity SSP to store L sets of search terms.

Assume that the search results are stored in the MSC whose addresses are separated by the term set code. When the query document was searched, the content of MSC is sent to the QPM in sequence of the term set while the term match grades are amounted in the MGA for every term set. When the output of MGA causes TFIP to output the positive data fidelity, the term set code is fixed, and then the CCPM with the current term set address is scanned to compare the content of the QPM with the content of CCPM. The following process is the same as the third and fourth steps during the query document classification.

Figure 15A:
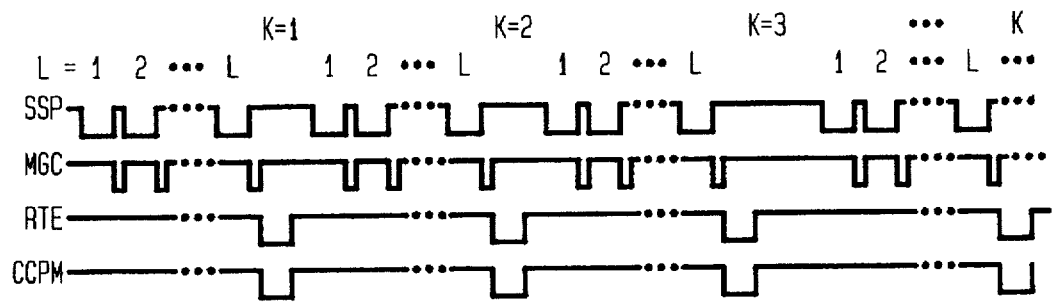
FIGS. 15(a), 15(b) and 15(c) are timing diagrams for categorization and classification.
Figure 15B:
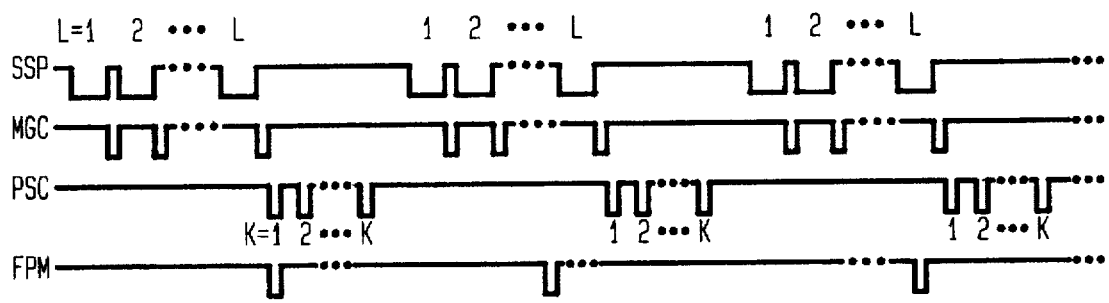
Figure 15C:
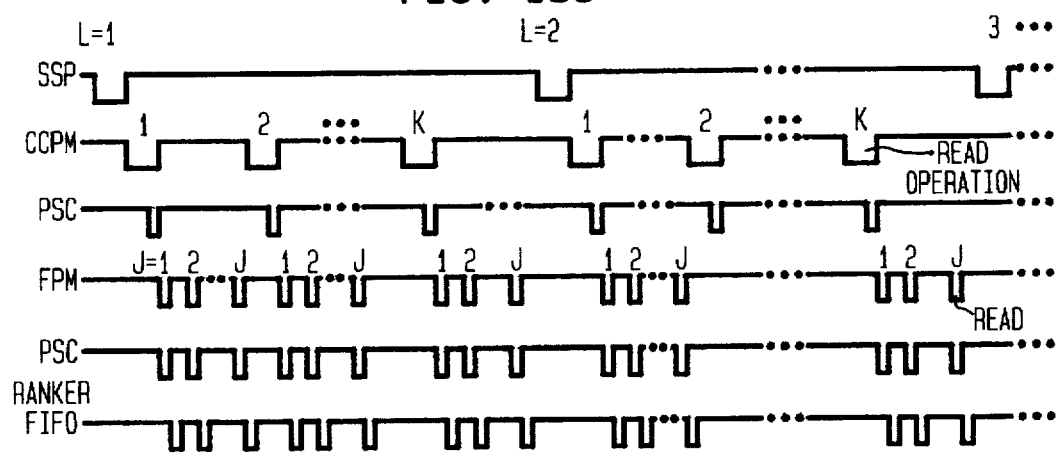
Figure 16A:
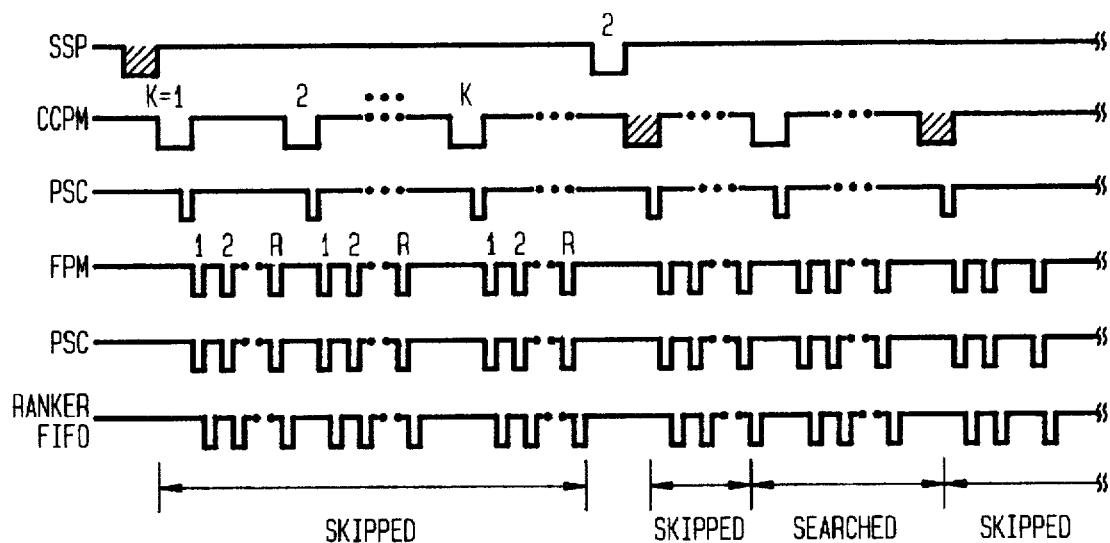
FIG. 16 is a timing diagram for skipped search operations.
Figure 16B:
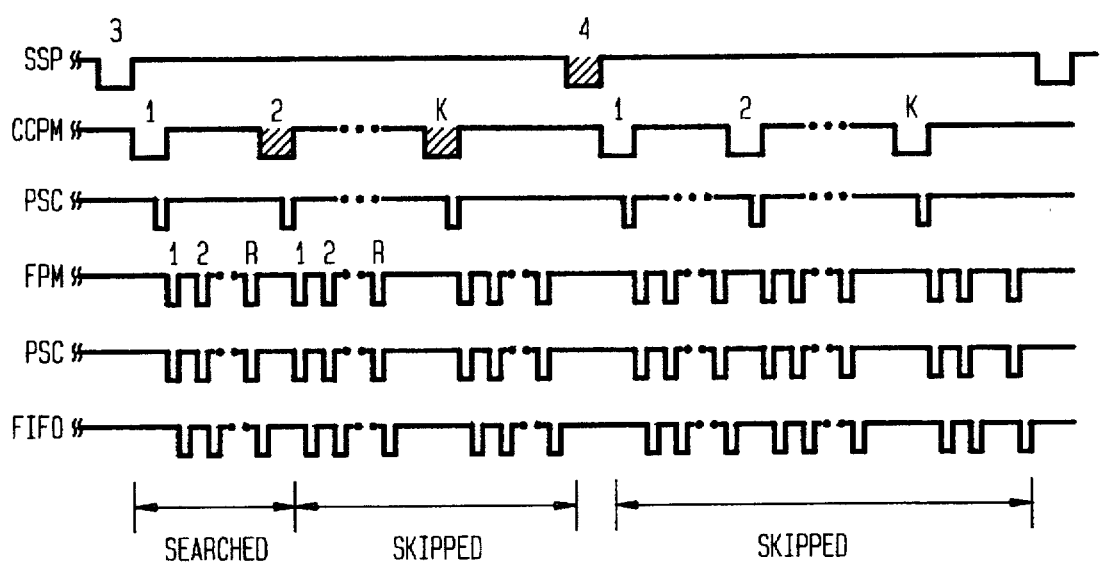

FIGS. 15(a), 15(b) and 15(c) show the timing diagram for categorization and classification for the closest pattern address search, and FIG. 16 shows the timing diagrams skipping of the pattern search in the classification period. In the categorization period, first, cluster center patterns (CCP) are categorized in the best area which is decided by the SSP, and second, filed patterns are categorized based on the similarity between the filed and cluster center patterns. The rule truth grades are estimated in RTE when the cluster of filed pattern is decided by the ranker FIFO.

In FIG. 15(a) each pulse at the SSP corresponds to a document search operation by the SSP. The pulse at the CCPM corresponds to a write operation for center pattern categorization. In FIG. 15(b) the pulse at FPM corresponds to a write operation for categorization of filed patterns. In FIG. 15(c) the pulses at CCPM and FPM memories correspond to read operations. The pulses at the output of ranker FIFO corresponds to the query pattern classification ranked by similarities.

In FIG. 16, which is a single continuous waveform including the shaded pulses at the SSP and CCPM which refer to skipped searches resulting from a mismatch result.

When the query document is classified, first, the query is searched by SSP. The term match grade amount is calculated in MGA and sent to the TFIP 34. If the data fidelity is judged to be positive in the TFIP, the query is compared with a cluster center pattern stored in CCPM. The similarity is calculated and sent to the TFIP. If the data fidelity is judged to be positive in TFIP, the query is compared with filed patterns in FPM. The similarity is sent to TFIP. The overall data fidelity is calculated in TFIP and sent to the ranker FIFO. It is noted that whenever TFIP outputs a negative data fidelity, the following pattern searches are skipped. The above example shows the case when $h_L=2/L$, $h_K=1/K$ and $2/K$, where $h_L$ and $h_K$ are the hit ratio of positive data fidelity in the TFIP.

The full text search time of m filed documents is $$Ts1=s \cdot m/f,$$

where s is document size to be normalized to $10^5$ bytes. In this case, the FPM, PSC and ranker FIFO are not used, the matched document addresses are not ranked by the similarity between the query and filed documents, though the software in the host-computer call analyze the text search results to rank the similarity. The software processing time is long and the software is expensive, though the preparation time is Tp1=0.

Using FPM, PSC and ranker FIFO, Ts becomes as follows:

$$Ts2=s/f+n \cdot m/f,$$

where n shows term numbers in SSP. If the document area is fixed, n is nearly equal to $10^2$. If the area is not fixed, n is $10^3$ or more. As long as n is fewer than s, Ts2 becomes shorter than Ts1. In this case, hardware such as FPM, PSC and ranker FIFO are needed. Furthermore, the preparation time of FPM contents becomes as follows:

$$Tp2=(s+n) \cdot m/f.$$

Though this preparation time Tp2 is nearly as long as Ts1, the contents of FPM is seldom updated. Thus, the performance to find the nearest document addresses is determined mainly by Ts2.

When the filed documents are categorized into L areas and k clusters per area, the transitive fuzzy-logic inference can be used to quickly decide the cluster of the query document. Even if r patterns in each cluster are sequentially searched, the overall search time Ts3 becomes as follows:

$$Ts3=(s+n)/f+h_L \cdot h_K \cdot m \cdot n/f,$$

where $h_L$ and $h_K$ are hit ratios of matched patterns in L areas and K clusters, respectively. The first term shows the period when the query document is searched by the large capacity SSP and the search results in MSC are sent to QPM. Though the content of QPM must be compared with $m=L \times K \times R$ filed patterns in FPM, if area and cluster do not meet the query, the following search can be omitted. Since the hit ratios $h_L$, $h_K$ become very low because the search domain is narrowed by the transitive fuzzy-logic inference. Thus, Ts3 will be determined mainly by the second term.

In this case, in addition to FPM, PSC and ranker FIFO, the CCPM, FIP and some accessory circuits must be added to the hardware. These are not as large as FPM or PSC. The preparation time to fill the contents of CCPM, FPM and RPM is as follows:

$$Tp3=L \cdot K \cdot (s+n)/f+m\{(s+n)+n \cdot K\}/f+2L \cdot K/f$$

where the first term shows the time to store L×K cluster center patterns in the CCPM and the second term shows the time to store the categorized filed patterns into the FPM, and the third term shows the time to store the rule truth grade in RTM 35 via the RTE 36.

When $s=10^5$, $n=10^3$, $m=10^6$ and $f=10^6$/sec in the conventional system, Ts1 becomes $10^5$ sec. When FPM, PSC and ranker FIFO are used, Ts2 becomes $10^3$ sec. When the filed patterns are categorized into L areas and K clusters per area, if L=16, K=64, R=m/(L·K)=$10^3$, n=$10^2$, $h_L$=1/10 and $k_K$=1/10, Ts3 becomes 1.1 sec. This value is markedly small compared with Ts1 and Ts2. The SSP search speed f can be increased to $10^7$/sec. In that case, Ts1, Ts2 and Ts3 become:

Ts1=$10_4$ sec, Ts2=$10^2$ sec and Ts3=0.11 sec.

The preparation times Tp2 and Tp3 at $f=10^6$/sec become:

$$Tp2=(s+n) \cdot m/f=(10^5+10^3) \cdot 10^6/10^6=1.01 \times 10^5 \text{ sec} + 28 \text{ hr.}$$

$$Tp3=(s+(K+1)n) \cdot m/f=1.6 \times 10^5 \text{ sec} + 44.4 \text{ hr.}$$

Although this preparation time (28 or 44.4 hours) is very long, it is not fatal, because the preparation is needed only when the filed patterns in the FPM are updated. By virtue of this long preparation time, the retrieval time becomes very short. Of course, it is anticipated that f will be increased by 10 times, because Tp3 can become 4.4 hours. This time 4.4 hours will be allowable when the document retrieval system is started up and tested.

In any event, since the preparation time of 4.4 or 44 hours seldom is needed, the performance is governed by the search time Ts. The search time Ts<1 sec is very useful and attractive for practical use, because the user can quickly find the nearest document addresses by inputting only the query document. Since the inference processor is realized by simple logic circuits, it will be possible to make the speed f higher than $10^7$/sec.

In order to improve the performance using the cluster center patterns, it is necessary to prepare the MSC, MFM, MGA, QPM, FPM, CCPM, PSC and FIP. The hardware comprises the memory and arithmetic logic operation. Thus, the hardware can be realized by a microcomputer board of a LSI chip, if the operation program is stored as microprograms in the read-only-memory ROM, EPROM, EEPROM and the like.

However, the document retrieval system may be realized as a document retrieval acceleration machine (DRAM) to operation together with a personal computer or other workstation. FPM needs m×n bytes memory capacity. When m is $10^6$ and n is $10^3$, FMP must be 1 Gbytes. This is very large. Compared with an FPM, the other processors PSC, ranker FIFO, MGA and FIP are very small.

Since the VLSI circuit technologies to realize 1 gigabit memory and 1 million gate processor in chip die are markedly progressed, the above hardware can be easily integrated in eight chips of functional memory in the future. At least, the document retrieval acceleration machine will be realized by two modules: an application specific CPU and a large capacity memory.

To accelerate the document retrieval by full-text search processor, two strategies using the fuzzy logics have been developed. The first strategy is to deal with search results as the term match grade patterns and to store all document search results as filed patterns. The nearest pattern is found by fuzzy logic matching between query and filed patterns.

The second strategy is to categorize the filed patterns by an area specific term set and cluster center patterns and to estimate the nearest filed pattern area and cluster by the fuzzy-logic inference from the term match grade volume and the similarity between the query and cluster center pattern. Finally, the nearest document addresses are output from the ranker FIFO in order of data fidelity.

The effects of these strategies on the document retrieval performance improvement were studied. If DFM stores 100 GB, the full-text search time becomes $10^4$ sec even at 10 MB/s of SSP. Using the first strategy and using FPC, PSC and ranker FIFO, the search time is shortened to about $10^2$ sec. Using the second strategy, the time will become around 1 sec.

The preparation time of the rule truth grades is kept equal to the full text search time $10^4$ sec or 2.8 hour. Since the preparation is needed only during the period when FPM contents is to be updated, the time 2.8 hours is not fatal, when considering the resultant performance improvement.

While there has been described and illustrated a preferred method and apparatus for document retrieval using fuzzy-logic inference, it will be apparent to those skilled in the art that variations and modifications are possible without deviating from the broad principles and spirit of the present invention which shall be limited solely by the scope of the claims appended hereto.

What is claimed is:

1. In a closest document retrieval system, finding from filed documents, the filed document closest to a query document based on a full-text search comprising:
   means for converting the filed documents and query document into patterns whose elements are term match grades obtained by fuzzification of a full-text search;
   means for comparing the filed patterns with the query pattern using a fuzzy grade matching function, and
   means for ranking the matching functions of the filed documents to rank the closest document.

2. In a closest document retrieval system, finding from filed documents, the filed document closest to a query document based on a full-text search comprising:
   means for converting the filed documents and query document into patterns whose elements are term match grades obtained by fuzzification of a full-text search;
   means for comparing the filed patterns with the query pattern using a fuzzy grade matching function, where said means for comparing comprises a pattern similarity calculator, and
   means for ranking the matching functions of the filed documents to rank the closest document where said means for ranking comprises a ranker FIFO.

3. A closest document retrieval system as set forth in claim 2, further comprising a string search processor means for receiving a document and storing search terms and term match grades, match frequency memory means for receiving the output of said string search processor means and storing said output with a string address code including an adder means for adding said term match grades to said output.

4. A closest document retrieval system as set forth in claim 3, further comprising a membership function memory means for fuzzification of the full-text document for storing a term match frequency per document value.

5. A closest document retrieval system as set forth in claim 2, where said means for comparing further comprises means for calculating a pattern similarity, for subtracting a difference grade from unity and for calculating the term average of an absolute difference between said term match grade in the query pattern and said term match grade in the filed pattern.

6. A closest document retrieval system as set forth in claim 2, where said ranker FIFO comprises shift-registers, similarity value comparators, and shift-clock control gates to store the similarity values in ranking order.

7. In a closest document retrieval system, finding from filed documents, the filed document closest to a query document based on a full-text search comprising:
   means for converting the filed documents and the query document into patterns whose elements are term match grades obtained by fuzzification of a full-text search;
   means for categorizing hierarchically said filed patterns into categories based on similarity between said filed pattern and a category center pattern;
   means for classifying hierarchically said query pattern using fuzzy logic inference based on similarity between said query pattern and a category center; and
   means for ranking the closest filed document to the query document based on inferenced data fidelity.

8. A closest document retrieval system as set forth in claim 7, where said means for categorizing ranks term match grade to determine a term set category or ranks the similarity between filed patterns and category center patterns to determine the closest category center pattern and the highest ranked value and second highest ranked value are used to determine an inference rule truth grade.

9. In a closest document retrieval system, finding from filed documents, the filed document closest to a query document based on a full-text search comprising:
   means for converting the filed documents and the query document into patterns whose elements are term match grades obtained by fuzzification of a full-text search;
   means for categorizing hierarchically said filed patterns into categories based on similarity between said filed pattern and a category center pattern by ranking term match grade to determine a term set category or by ranking the similarity between filed patterns and category center patterns to determine the closest category center pattern and the highest ranked value and second highest ranked value are used to determine an inference rule truth grade;
   means for classifying hierarchically said query pattern using fuzzy logic inference based on similarity between said query pattern and a category center; and
   means for ranking the closest filed document to the query document based on inferenced data fidelity, where the difference between unity and the bounded difference between the MAX of the second highest values and the MIN of the highest values is used to determine a category inference rule truth grade.

10. In a closest document retrieval system finding from filed documents, the filed document closest to a query document based on a full-text search comprising:
    means for converting the filed documents and the query document into patterns whose elements are term match grades obtained by fuzzification of a full-text search;
    means for categorizing hierarchically said filed patterns into categories based on similarity between said filed pattern and a category center pattern;
    means for classifying hierarchically said query pattern using fuzzy logic inference based on similarity between said query pattern and a category center where said means for classifying hierarchically classifies categories in layers and comprises transitive fuzzy-logic inference processor means including a bounded difference calculator to determine the bounded difference between the rule-truth grade and the term-match grades between the query document and a second term set or to determine the bounded difference between the rule truth grade and the similarity between the query pattern and a category center pattern, first MIN selectors located between the term match grade or the similarity value of a category in one layer and a previous layer, and second MIN selector for prioritizing an output of the data fidelities; and means for ranking the closest filed document to the query document based on inferenced data fidelity.

11. In a closet document retrieval system, finding from filed documents, the filed document closest to a query document based on a full-text search comprising:

means for converting the filed documents and the query document into patterns whose elements are term match grades obtained by fuzzification of a full text-search;

means for categorizing hierarchically said filed patterns into categories based on similarly between said filed pattern and a category center pattern;

means for classifying hierarchically said query pattern using fuzzy logic inference based on similarity between said query pattern and a category center by classifying categories in layers and comprising transitive fuzzy-logic inference processor means including a bounded difference calculator to determine the bounded difference between the rule-truth grade and the term-match grades between the query document and a second term set or to determine the bounded difference between the rule truth grade and the similarity between the query pattern and a category center pattern, first MIN selectors located between the term match grade or the similarity value of a category in one layer and a previous layer, and second MIN selector for prioritizing an output of the data fidelities, where when the data fidelity is positive, a lower layer category is searched, after all categories in a layer are searched the layer category to be searched is incremented, and when the data fidelity is negative, the same layer or a higher layer category is searched; and means for ranking the closest filed document to the query document based on inferenced data fidelity.

12. A closest document retrieval system to find the closest document to a query document from filed documents, based on a full-text search, comprising:

first means for categorizing filed documents by term match grade values of each filed document to a standard document;

string search processor means for searching a filed document in an index of standard document;

second means for categorizing by similarity between each section of the standard document and the filed documents;

third means for categorizing documents in a single category by similarity between a typical document in the single category and the filed documents in the single category; and storage means for storing categorized documents as filed patterns with an address code whose bits correspond to the higher layer categorization codes.

13. A closest document retrieval system to find the closest document to a query document from filed documents, based on a full-text search, comprising:

first means for categorizing filed documents by term match grade values of each filed document to a standard document;

string search processor means for searching a filed document in an index of standard document;

second means for categorizing by similarity between each section of the standard document and the filed documents;

third means for categorizing documents in a single category by similarity between a typical document in the single category and the filed documents in the single category; and storage means for storing categorized documents as filed patterns with an address code whose bits correspond to the higher layer categorization codes;

where the category in which a filed document is categorized is determined by the category of the top ranked term match grade value or similarity stored after the filed document is compared with a term set or center pattern of each category in a layer and where the category inference rule truth grade is determined from a complement of the difference between the minimum value of the highest ranked term match grade or the similarity and the maximum value of the next highest ranked term match grade amount or similarity, where ranking is performed in a ranker FIFO.

14. A closest document retrieval system to find the closest document to a query document from filed documents, based on a full-text search, comprising:

first means for categorizing filed documents by term match grade values of each filed document to a standard document;

string search processor means for searching a filed document in an index of standard document;

second means for categorizing by similarity between each section of the standard document and the filed documents;

third means for categorizing documents in a single category by similarity between a typical document in the single category and the filed documents in the single category; and storage means for storing categorized documents as filed patterns with an address code whose bits correspond to the higher layer categorization codes;

where a category is divided into sub-categories and the similarity of each filed document in the sub-category center is calculated using a weight memory and average calculator means for determining the difference between the ith term match grades for the filed document and sub-category center document.

15. A closest document retrieval system to find the closest document to a query document from filed documents, based on a full-text search, comprising:

first means for categorizing filed documents by term match grade values of each filed document to a standard document;

string search processor means for searching a filed document in an index of standard document;

second means for categorizing by similarity between each section of the standard document and the filed documents;

third means for categorizing documents in a single category by similarity between a typical document in the single category and the filed documents in the single category;

storage means for storing categorized documents as filed patterns with an address code whose bits correspond to the higher layer categorization codes;

membership function memory means which provides as an output an element of a center pattern or filed pattern term match grade when each term match signal frequency stored in a count buffer memory means by adding a match signal to the contents of the memory at each term address; and a string search processor means for searching a center document or filed document which is input with said membership function memory means and which is stored in a cluster center pattern memory or a filed pattern memory.

16. A closest document retrieval system as set forth in claim 15, where the query document is stored as a filed pattern in said filed pattern memory with updated term weight for each term per category after searching by the string search processor and after hierarchical classification into transitively inferred categories with the highest data fidelity per layer.

17. A closest document retrieval system for finding the closest document from filed documents to a query document based on a full-text search comprising:

string search processor means storing term sets for each category of document on a highest layer for searching the query document and for converting the query document in a query pattern whose elements are term match grades where the term match grade value is calculated and provided to a transitive fuzzy-logic inference processor, and for classifying the query pattern into a category for providing a positive bounded difference between a rule truth grade value and a term match grade value in said transitive fuzzy-logic inference processor;

when the highest layer category has a positive data fidelity, the next layer category center patterns are compared with the query pattern and the similarity between the query pattern and the category center pattern is input to the transitive fuzzy-logic inference processor along with the rule truth grade provided from a rule truth grade memory with an address as the category center code which is used to determine a positive bounded difference between the rule-truth grade and the similarity;

when the bounded difference is negative, a lower layer category center patterns or filed patterns in a lower layer category are not scanned by the string search processor;

when the bounded difference is positive, the center category patterns are compared with the query pattern until comparison with filed patterns in the lowest layer category is completed; and ranker FIFO means for ranking data fidelity based on minimum values of the bounded differences and corresponding filed pattern address codes and for storing the closest document addresses in order of data fidelity magnitude.

18. A closest document retrieval system as set forth in claim 17, where said transitive inference processor comprises an input data switch controlled by a layer code, a plurality of MIN circuits, a plurality of bounded difference calculators, a plurality of MIN fidelity selectors, data fidelity polarity detectors, matched layer encoders for providing as an output of the layer code used to determine the memory address of the rule truth grade memory to output the rule truth grade and memory address of the category center memory or filed pattern memory.

19. A closest document retrieval system as set forth in claim 18, where said transitive fuzzy-logic inference processor changes the clock signal for the category address scanning in said string search processor, category center memory and said filed pattern memory when the data fidelity is less than a predetermined threshold.

20. A closest document retrieval system as set forth in claim 19, where said predetermined threshold is zero.

* * * * *